US011909291B2

(12) United States Patent
Takahashi et al.

(10) Patent No.: US 11,909,291 B2
(45) Date of Patent: Feb. 20, 2024

(54) ROTARY RECIPROCATING DRIVE ACTUATOR WITH MOVABLE ELEMENT AND MAGNETS AND ROTATING MIRROR

(71) Applicants: Yuki Takahashi, Tokyo (JP); Yasutaka Kitamura, Tokyo (JP); Masaharu Kagami, Tokyo (JP); Shigenori Inamoto, Tokyo (JP)

(72) Inventors: Yuki Takahashi, Tokyo (JP); Yasutaka Kitamura, Tokyo (JP); Masaharu Kagami, Tokyo (JP); Shigenori Inamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 331 days.

(21) Appl. No.: 17/255,227

(22) PCT Filed: Jun. 26, 2019

(86) PCT No.: PCT/JP2019/025505
§ 371 (c)(1),
(2) Date: Dec. 22, 2020

(87) PCT Pub. No.: WO2020/004514
PCT Pub. Date: Jan. 2, 2020

(65) Prior Publication Data
US 2021/0265904 A1 Aug. 26, 2021

(30) Foreign Application Priority Data

Jun. 26, 2018 (JP) ................................ 2018-121167

(51) Int. Cl.
*H02K 33/14* (2006.01)
*H02K 11/215* (2016.01)
(Continued)

(52) U.S. Cl.
CPC ......... *H02K 33/14* (2013.01); *G02B 26/0816* (2013.01); *G02B 26/10* (2013.01);
(Continued)

(58) Field of Classification Search
CPC .... G02B 26/10; G02B 26/105; G02B 26/108; G02B 26/08; G02B 3/0072; G02B 26/085;
(Continued)

(56) References Cited

U.S. PATENT DOCUMENTS 4,196,456 A * 4/1980 Manzke ............... G11B 5/5521
4,314,295 A * 2/1982 Frandsen ............... H02K 41/03
360/78.12
(Continued)

FOREIGN PATENT DOCUMENTS

CN 107430194 A 12/2017
EP 0371799 B1 3/1996
(Continued)

OTHER PUBLICATIONS

JP2004074166A English Translation (Year: 2004).*
(Continued)

*Primary Examiner* — Maged M Almawri
(74) *Attorney, Agent, or Firm* — Shih IP Law Group, PLLC

(57) ABSTRACT

A rotary reciprocating drive actuator reciprocally and rotationally driving the movable body about the shaft part in relation to the fixed body by the electromagnetic mutual effect of the coil and the movable magnet, wherein the movable magnet is magnetized in the radial direction of the shaft part, the two magnetic poles are disposed facing each other across an air gap in the radial direction of the movable magnet and the shaft part, and the fixed body has a rotation-angle-holding part disposed facing the movable magnet
(Continued)

across the air gap, the rotation-angle-holding part holding the rotation angle position of the movable magnet by the magnetic attraction force generated with the movable magnet.

21 Claims, 16 Drawing Sheets

(51) Int. Cl.
- *H02K 11/22* (2016.01)
- *G02B 26/08* (2006.01)
- *G02B 26/10* (2006.01)
- *H02K 7/08* (2006.01)

(52) U.S. Cl.
CPC ............. *H02K 7/08* (2013.01); *H02K 11/215* (2016.01); *H02K 11/22* (2016.01)

(58) Field of Classification Search
CPC .... G02B 27/0176; H02K 33/18; H02K 33/12; H02K 11/22; B81B 3/0078; B81B 3/0045; B81B 3/0072; B81B 2203/0154; Y10T 74/10
USPC ...... 310/15, 25, 300–309, 40 MM; 359/199, 359/199.1
See application file for complete search history.

(56) References Cited

U.S. PATENT DOCUMENTS

| | | | | |
|---|---|---|---|---|
| 4,340,833 A * | 7/1982 | Sudo | H02K 3/26 | 310/268 |
| 4,370,019 A * | 1/1983 | Shirasaki | G02B 26/10 | 359/199.1 |
| 4,490,635 A * | 12/1984 | Harrison | G11B 5/5556 | 360/78.12 |
| 4,502,752 A * | 3/1985 | Montagu | G02B 7/1821 | 318/128 |
| 4,509,109 A * | 4/1985 | Hansen | H01F 5/003 | 335/282 |
| 4,626,717 A * | 12/1986 | Hensing | H02K 33/06 | 310/38 |
| 4,658,162 A * | 4/1987 | Koyama | H02K 29/08 | 318/135 |
| 4,919,500 A * | 4/1990 | Paulsen | G02B 26/08 | 359/214.1 |
| 4,974,918 A * | 12/1990 | Delache | G02B 26/08 | 310/38 |
| 5,097,355 A * | 3/1992 | Eden | G02B 26/10 | 359/213.1 |
| 5,187,612 A * | 2/1993 | Plesko | G06K 7/10881 | 359/200.7 |
| 5,206,762 A | 4/1993 | Kasahara | | |
| 5,283,682 A | 2/1994 | Ostaszewski | | |
| 5,337,865 A * | 8/1994 | Kasahara | G11B 7/0932 | 188/267.2 |
| 5,596,442 A * | 1/1997 | Plesko | G06K 7/10762 | 359/213.1 |
| 5,606,447 A * | 2/1997 | Asada | G02B 26/0816 | 359/198.1 |
| 5,610,752 A * | 3/1997 | Hayakawa | G06K 7/10584 | 359/198.1 |
| 5,703,555 A * | 12/1997 | McCann | H02K 26/00 | 310/40 R |
| 5,787,067 A * | 7/1998 | Song | G11B 33/08 | |
| 5,982,521 A * | 11/1999 | Bessho | G02B 26/105 | 359/198.1 |
| 6,046,583 A * | 4/2000 | Ayres | G01R 7/06 | 324/154 PB |
| 6,064,471 A * | 5/2000 | Nakagawa | G01S 7/4817 | 359/199.1 |
| 6,144,281 A * | 11/2000 | Lorris | H01F 5/003 | 336/200 |
| 6,188,502 B1 * | 2/2001 | Aoki | G02B 27/20 | 359/198.1 |
| 6,327,066 B2 * | 12/2001 | Takishima | G11B 7/08576 | 250/236 |
| 6,421,208 B1 * | 7/2002 | Oveyssi | H02K 41/0358 | 310/15 |
| 6,781,259 B2 * | 8/2004 | Hente | H02K 33/18 | 310/13 |
| 7,476,999 B2 * | 1/2009 | Friedland | H02K 33/18 | 310/264 |
| 7,697,180 B2 * | 4/2010 | Nakajima | G02B 26/127 | 359/213.1 |
| 7,719,396 B2 * | 5/2010 | Umeda | H02K 33/16 | 359/199.1 |
| 7,773,281 B2 * | 8/2010 | Maeno | G02B 26/085 | 359/200.7 |
| 7,990,595 B1 * | 8/2011 | Chou | G02B 26/101 | 359/200.7 |
| 8,031,386 B2 * | 10/2011 | Hirose | H02P 23/14 | 250/236 |
| 8,130,436 B2 * | 3/2012 | Borchers | G02B 26/085 | 359/200.7 |
| 8,144,380 B2 * | 3/2012 | Takeuchi | G02B 26/085 | 359/200.7 |
| 8,362,751 B2 * | 1/2013 | Lin | H02K 3/26 | 336/200 |
| 8,390,909 B2 * | 3/2013 | Plesko | G02B 26/105 | 359/200.7 |
| 8,456,724 B2 * | 6/2013 | Lin | G02B 26/101 | 359/199.1 |
| 8,582,191 B2 * | 11/2013 | Borchers | G02B 26/105 | 359/200.7 |
| 8,752,969 B1 * | 6/2014 | Kane | G02B 26/101 | 359/872 |
| 9,035,502 B2 * | 5/2015 | Park | G02B 27/646 | 310/12.21 |
| 9,825,499 B2 * | 11/2017 | Rajasingham | H02K 21/24 | |
| 9,997,984 B2 * | 6/2018 | Fujimoto | B81B 3/0043 | |
| 10,101,457 B1 * | 10/2018 | Topliss | G02B 26/101 | |
| 2001/0021165 A1 * | 9/2001 | Nakagishi | G11B 7/08576 | 369/255 |
| 2002/0181839 A1 * | 12/2002 | Brown | G02B 6/3572 | 385/16 |
| 2005/0116800 A1 * | 6/2005 | Nelson | H02K 26/00 | 310/36 |
| 2005/0128609 A1 * | 6/2005 | Shimada | G02B 26/085 | 359/849 |
| 2005/0185237 A1 * | 8/2005 | Nakajima | G02B 26/105 | 359/224.1 |
| 2005/0185239 A1 * | 8/2005 | Orcutt | G02B 26/0833 | 359/199.1 |
| 2006/0131965 A1 * | 6/2006 | Friedland | H02K 26/00 | 310/12.22 |
| 2007/0044545 A1 * | 3/2007 | Beyder | B82Y 35/00 | 356/600 |
| 2007/0047047 A1 * | 3/2007 | Takeuchi | G02B 26/105 | 359/206.1 |
| 2009/0128878 A1 * | 5/2009 | Jun | G01R 33/07 | 324/207.2 |
| 2009/0185250 A1 * | 7/2009 | Turner | G02B 26/105 | 359/199.1 |
| 2009/0310198 A1 * | 12/2009 | Woo | G02B 26/105 | 359/200.7 |
| 2010/0014140 A1 * | 1/2010 | Akedo | G02B 26/0833 | 359/199.1 |
| 2011/0069365 A1 * | 3/2011 | Edmonds | G06K 7/10643 | 310/38 |
| 2011/0228367 A1 * | 9/2011 | Lubianiker | H02K 33/16 | 318/116 |
| 2012/0002259 A1 * | 1/2012 | Plesko | G02B 26/105 | 359/200.7 |
| 2012/0062048 A1 | 3/2012 | Kaneko | | |
| 2012/0120458 A1 * | 5/2012 | Hino | G02B 26/085 | 74/25 |

(56) References Cited

U.S. PATENT DOCUMENTS

| | | | | |
|---|---|---|---|---|
| 2012/0228996 | A1* | 9/2012 | Suzuki | G02B 26/0833 310/323.01 |
| 2013/0200158 | A1* | 8/2013 | Feng | G02B 26/105 235/462.36 |
| 2013/0229698 | A1* | 9/2013 | Honda | G02B 26/105 359/199.3 |
| 2014/0118809 | A1* | 5/2014 | Honda | G02B 26/105 359/199.3 |
| 2014/0300942 | A1* | 10/2014 | Van Lierop | G02B 26/0833 359/198.1 |
| 2015/0042870 | A1* | 2/2015 | Chan | H04N 23/69 359/733 |
| 2016/0077331 | A1* | 3/2016 | Walter | G02B 26/105 359/200.7 |
| 2016/0178894 | A1* | 6/2016 | Rose | G02B 26/085 359/199.3 |
| 2016/0223319 | A1* | 8/2016 | Munro | G01S 17/89 |
| 2018/0024350 | A1* | 1/2018 | Kumihashi | H04N 23/687 348/208.2 |
| 2019/0204585 | A1* | 7/2019 | Coffin | G01J 3/06 |
| 2020/0249469 | A1 | 8/2020 | Raab et al. | |
| 2021/0065948 | A1* | 3/2021 | Claeyssen | H02K 1/34 |
| 2021/0184554 | A1* | 6/2021 | Takahashi | H02K 33/18 |
| 2021/0265904 | A1 | 8/2021 | Takahashi | |
| 2021/0364609 | A1* | 11/2021 | Hall | G01S 17/89 |
| 2022/0043255 | A1* | 2/2022 | Kitamura | G02B 26/105 |

FOREIGN PATENT DOCUMENTS

| | | |
|---|---|---|
| JP | S61-129804 A | 6/1986 |
| JP | S62-260557 A | 11/1987 |
| JP | H05-181078 A | 7/1993 |
| JP | 2003-043405 A | 2/2003 |
| JP | 2004-074166 A | 3/2004 |
| JP | 2007-333873 A | 12/2007 |
| JP | 2008-047648 A | 2/2008 |
| JP | 2008-301626 A | 12/2008 |
| JP | 4727509 B2 | 7/2011 |
| JP | 2012-068451 A | 4/2012 |
| JP | WO2013183435 A1 * | 3/2013 |
| JP | 5744330 | 7/2015 |
| JP | 2018-106059 A | 7/2018 |
| JP | 2018-121167 A | 8/2018 |
| KR | 10-1993-0005974 B1 | 6/1993 |
| KR | 10-2006-0024430 A | 3/2006 |
| WO | 2018051757 A1 | 3/2018 |

OTHER PUBLICATIONS

JP2008047648A (Year: 2008).*
JPH05181078A (Year: 1991).*
JPS62237302A (Year: 1986).*
WO2013183435A1 (Year:2013).*
Extended European Search Report dated Feb. 3, 2022.
Office Action issued in U.S. Appl. No. 17/120,176, dated May 25, 2022.
International Search Report from International Application No. PCT/JP2019/025505 dated Sep. 17, 2019.
Office Action dated Nov. 20, 2023 for related U.S. Appl. No. 18/195,957.

* cited by examiner

ROTARY RECIPROCATING DRIVE ACTUATOR WITH MOVABLE ELEMENT AND MAGNETS AND ROTATING MIRROR

TECHNICAL FIELD

The present invention relates to a rotary reciprocating drive actuator.

BACKGROUND ART

In the related art, as a rotary reciprocating drive actuator, a galvano motor configured to change a reflection angle of a mirror configured to reflect laser light to irradiate scanning object with the light in a multifunctional device, a laser beam printer and the like is known.

Various types of galvano motors, such as a coil movable structure with a mirror attached to a coil (which is referred to as "coil movable type") and the structure disclosed in PTL 1, are known.

PTL 1 discloses a beam scanner in which four permanent magnets are disposed to a rotation shaft to which a mirror is attached such that the magnets are magnetized in the radial direction of the rotation shaft, and cores including a magnetic pole on which a coil is wound are disposed to sandwich the rotation shaft.

CITATION LIST

Patent Literature

PTL 1
Japanese Patent Publication No. 4727509

SUMMARY OF INVENTION

Technical Problem

Incidentally, in the coil movable type, the heat generated at the coil upon driving may affect the state of the mirror surface, the joining state of the mirror to the rotation shaft, and the mirror shape such as warp. In addition, in the coil movable type, it is difficult to increase the current input to the coil if the heat generation at the coil upon energization is taken into consideration, and accordingly it is difficult to increase the size and amplitude of the mirror serving as a movable member. Further, the wiring to the coil is required to be pulled out to the fixing body side with respect to the mirror serving as a movable member, which leads to poor assemblability.

In addition, in PTL 1, the magnet is disposed on the movable member side, and thus the above-described problems of the coil movable type can be solved; however, to stop the magnet at a neutral position with respect to a core, or in other words, to set the switching part of the magnetic pole of the magnet at the center of the core, magnets of two poles for each pole of the core, i.e., a total of four magnets, are required.

With this configuration, in comparison with the case where the same scanner is configured with a magnet with two poles, the amplitude of the movable member is reduced, or in other words, the sway range is reduced, for example. In addition, since at least four magnets are used, the configuration is complicated with a large number of components, which is difficult to assemble.

Under such circumstances, in recent years, as a rotary reciprocating drive actuator used for scanners, there is a demand for a rotary reciprocating drive actuator that achieves rigidity, impact resistance, vibration proofness, improvement in assemblability, and high amplitude in view of upsizing of a mirror as a movable member.

An object of the present invention is to provide a rotary reciprocating drive actuator that achieves high manufacturability, high assembly accuracy, and driving at a high amplitude even when the movable object is a large mirror.

Solution to Problem

A rotary reciprocating drive actuator of an embodiment of the present invention includes a movable member including a shaft to which a movable object is connected and a movable magnet fixed to the shaft; a fixing body including a coil and a core on which the coil is wound, the core including even-numbered magnetic poles, the fixing body being configured to rotatably support the shaft, the rotary reciprocating drive actuator being configured to use electromagnetic interaction between the coil that is energized and the movable magnet to drive the movable member into reciprocating rotation about the shaft with respect to the fixing body, wherein the movable magnet has a ring shape with even-numbered magnetic poles alternately magnetized in an S pole and an N pole at an outer periphery of the shaft, wherein the number of the even-numbered magnetic poles of the core and the number of the even-numbered magnetic poles of the movable magnet are equal to each other, wherein the even-numbered magnetic poles of the core are disposed opposite to the movable magnet at an outer periphery side of the shaft with an air gap between the even-numbered magnetic poles of the core and the movable magnet, and wherein the fixing body includes a rotation angle position holding part disposed opposite to the movable magnet with an air gap between the rotation angle position holding part and the movable magnet, the rotation angle position holding part being configured to use a magnetic attractive force generated between the rotation angle position holding part and the movable magnet to hold a rotation angle position of the movable magnet.

Advantageous Effects of Invention

According to the present invention, it is possible to achieve high manufacturability, high assembly accuracy, and driving at a high amplitude even when the movable object is a large mirror.

DESCRIPTION OF EMBODIMENTS

Embodiments of the present invention are elaborated below with reference to the accompanying drawings.

Embodiment 1

In the following description, each part of rotary reciprocating drive actuator 1 of the present embodiment will be described with a non-operation state, which is a normal state where rotary reciprocating drive actuator 1 is not driven, as a reference. In addition, a structure of rotary reciprocating drive actuator 1 of the present embodiment is described using an orthogonal coordinate system (X, Y, Z). The common orthogonal coordinate system (X, Y, Z) is used for illustration also in drawings described later. Note that the axis direction includes the Z direction and the −Z direction.

Figure 1:
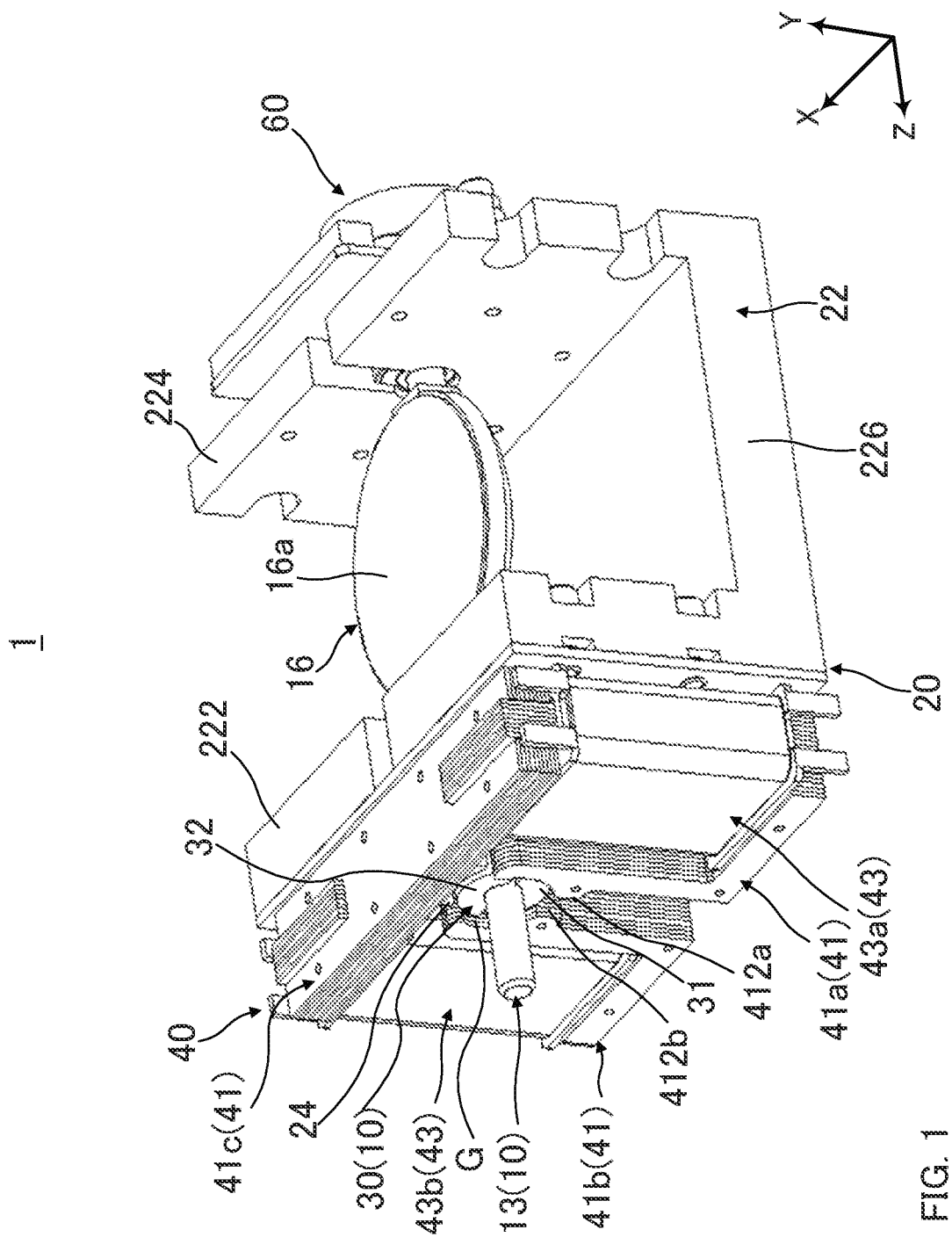
FIG. 1 is a perspective view of an external appearance of a rotary reciprocating drive actuator according to Embodiment 1 of the present invention.
Figure 2:
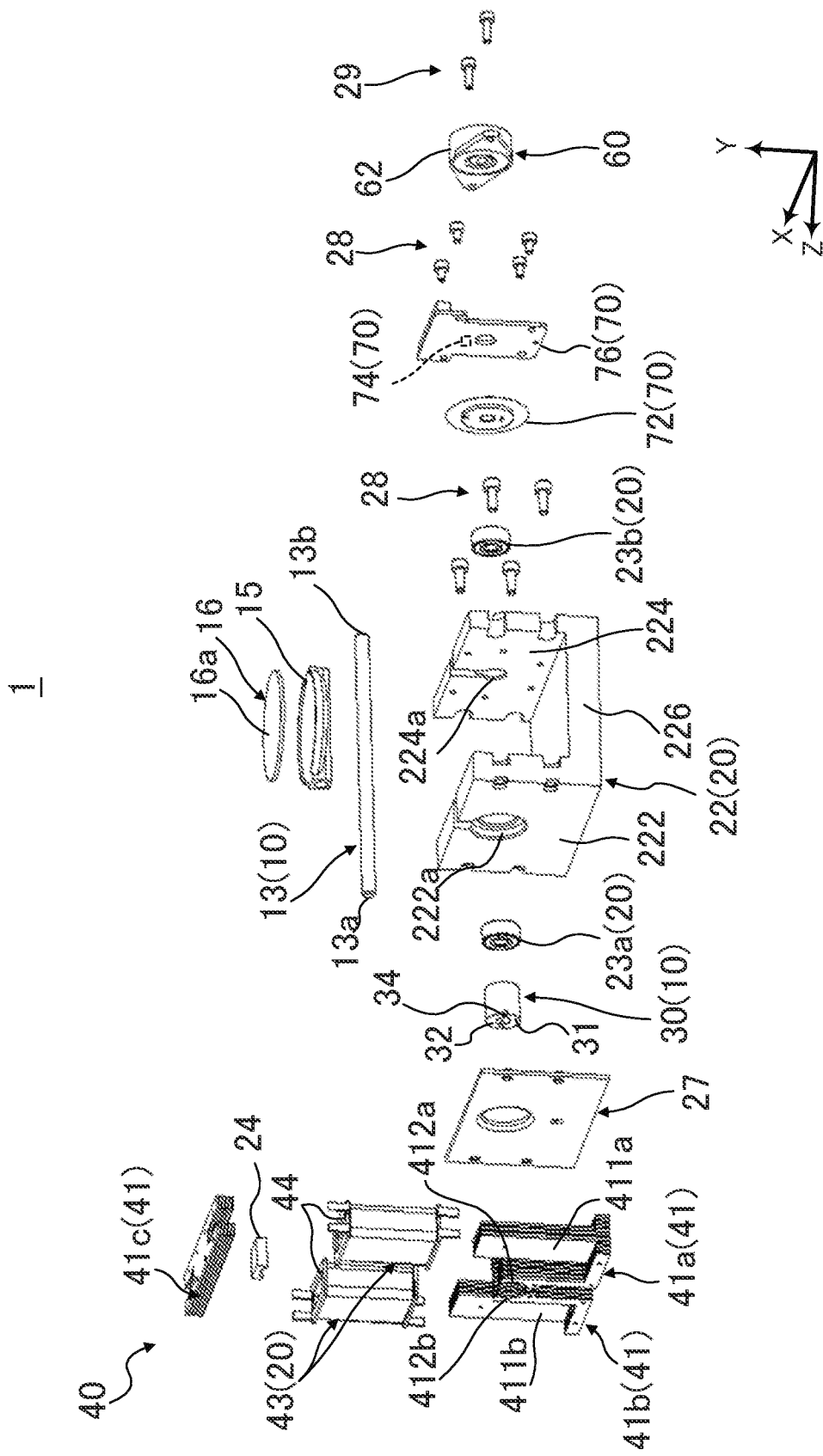
FIG. 2 is an exploded perspective view of the rotary reciprocating drive actuator according to Embodiment 1 of the present invention.
Figure 3:
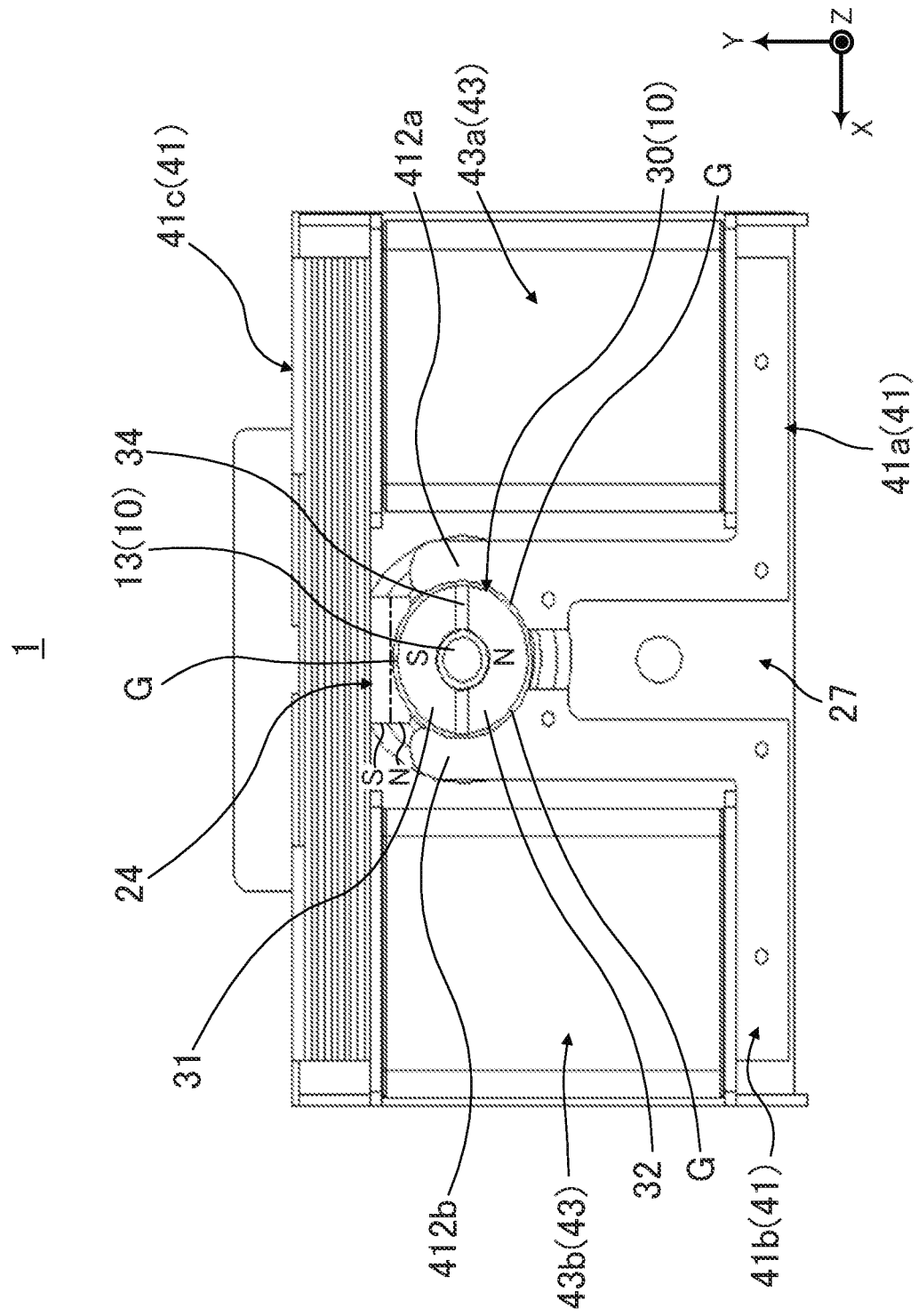
FIG. 3 is a plan view illustrating a configuration of a main part of the rotary reciprocating drive actuator according to Embodiment 1 of the present invention.

FIG. 1 is a perspective view of an external appearance of rotary reciprocating drive actuator 1 according to Embodiment 1 of the present invention, FIG. 2 is an exploded perspective view of rotary reciprocating drive actuator 1 according to Embodiment 1 of the present invention, and FIG. 3 is a plan view illustrating a configuration of a main part of rotary reciprocating drive actuator 1 according to Embodiment 1 of the present invention.

Rotary reciprocating drive actuator 1 drives movable member 10 to which a movable object is connected into reciprocating rotation about shaft 13. Rotary reciprocating drive actuator 1 includes mirror 16 as a movable object in movable member 10. Rotary reciprocating drive actuator 1 is used as a light scanner that irradiates a scanning object with laser light or the like using mirror 16 and acquires reflection light so as to acquire information on the scanning object through LIDER (Laser Imaging Detection and Ranging) or the like, for example. Note that rotary reciprocating drive actuator 1 is applicable to a scanning device such as a multifunctional device and a laser beam printer. In particular, rotary reciprocating drive actuator 1 can favorably function even under an external force, and is preferably applied to a device that can receive an impact during travelling, such as a vehicle-mountable scanner.

Rotary reciprocating drive actuator 1 includes movable member 10 including movable magnet 30 and shaft 13, and fixing body 20 including rotation angle position holding part (hereinafter referred to as "magnet position holding part") 24 for coil 43 and movable magnet 30. Fixing body 20 rotatably supports shaft 13.

In rotary reciprocating drive actuator 1, movable member 10 is turnably held such that movable member 10 is located at the operation reference position in a normal state with a magnetic attractive force, or a so-called magnet spring, of magnet position holding part 24 and movable magnet 30. Here, in the normal state, coil 43 is not energized. In the present embodiment, the state where movable member 10 is located at the operation reference position means that movable magnet 30 is located at a neutral position with respect to magnetic poles 412a and 412b to be excited in coil 43, where it can be rotated about the axis in the same manner in one direction and the other direction (the normal rotation and the reverse rotation as viewed from shaft 13 side). When movable member 10 is located at the operation reference position, switching part (also referred to as "magnetic pole switching part") 34 of the magnetic pole as a portion where the magnetic pole is switched in movable magnet 30 is located at a position opposite to the magnetic pole of coil 43 side. Magnetic pole switching part 34 is provided in two portions in the outer periphery part of movable magnet 30. The operation reference position is a position where movable magnet 30 is rotatable with the same torque in right-handed rotation and left-handed rotation when driven into reciprocating rotation about shaft 13.

By the cooperation of movable magnet 30 and coil 43, shaft 13 of movable member 10 is appropriately moved, or in the present embodiment, driven into reciprocating rotation, i.e., sway or vibration, in one direction and the other direction about the axis with respect to fixing body 20 from the operation reference position.

Movable Member 10

In addition to shaft 13 and movable magnet 30 fixed to shaft 13, movable member 10 includes encoder disk 72 of rotation angle position detection part 70 described later, and mirror 16 is fixed to shaft 13 through mirror holder 15. Mirror 16 reflects and emits laser light, which is incident light, to perform scanning. Note that while mirror 16 is attached such that the mirror serves as the movable object capable of reciprocating rotation vibration about shaft 13 in movable member 10 of the present embodiment, the movable object may not be mirror 16 as a matter of course.

Shaft 13 is supported such that it is rotatable about the axis with respect to fixing body 20. Shaft 13 may be pivotally supported in any manner as long as shaft 13 is movably pivotally supported by fixing body 20. In the present embodiment, shaft 13 is pivotally supported through bearings 23a and 23b.

Shaft 13 is formed of a metal (e.g., SUS420J2) having durability, and is connected to a movable object. The movable object is a member serving as an object that is driven into reciprocating rotation, and may be movable member 10 itself.

Shaft 13 is pivotally supported by fixing body 20 through bearings 23a and 23b at positions spaced away from each other in the axis direction. At the portion between bearings 23a and 23b (here, the center portion) mirror 16 serving as the movable object is fixed through mirror holder 15. In addition, regarding the position of bearing 23a, bearing 23a is disposed between movable magnet 30 and mirror 16 serving as the movable object in shaft 13.

Note that mirror 16 is attached with reflecting surface 16a disposed in the tangential direction of shaft 13 such that the angle of reflecting surface 16a is changeable along with a rotation of shaft 13.

Mirror 16 attached on shaft 13 may be attached at a position (displaced position) on one side closer to end portion 13a or 13b in the entire length of shaft 13. In this case, it is preferable that it is pivotally supported to fixing body 20B on the other end portion 13b side in shaft 13 through bearings 232 and 234 (see rotary reciprocating drive actuator 1B of FIGS. 12 and 13).

In the present embodiment, shaft 13 is pivotally supported by base 22 at end portions 13a and 13b through bearings 23a and 23b in such a manner as to sandwich mirror 16 therebetween. With this configuration, mirror 16 is more tightly held, and the impact resistance and the vibration resistance are increased in comparison with a configuration it is fixed by a cantilever.

In addition, in the present embodiment, movable magnet 30 is fixed at one end portion 13a of shaft 13, and attenuator 60 attached to fixing body 20 is connected at the other end portion 13b. Attenuator 60 is an example of the attenuation part Movable magnet 30 has even-numbered magnetic poles alternately magnetized in S pole and N pole in a direction orthogonal to the rotation axis direction of shaft 13 at the outer periphery of shaft 13. Movable magnet 30 is magnetized in two poles in the present embodiment, but may be magnetized in two or more poles in accordance with the amplitude in the movable state.

Movable magnet 30 has a ring shape. In movable magnet 30, even-numbered magnetic poles 31 and 32 are alternately magnetized in S poles and N poles at the outer periphery of shaft 13.

In the present embodiment, movable magnet 30 includes even-numbered magnetic poles 31 and 32 respectively including magnetization surfaces of different polarities opposite to each other with shaft 13 therebetween. In the present embodiment, magnetic poles 31 and 32 have polarities that differ from each other with respect to a boundary plane extending along the axis direction of shaft 13.

In addition, even-numbered magnetic poles 31 and 32 in movable magnet 30 are magnetized at even intervals at the outer periphery of shaft 13.

In this manner, even-numbered magnetic poles 31 and 32 in S poles and N poles are alternately disposed at even intervals in movable magnet 30 at the outer periphery of shaft 13.

In movable magnet 30, magnetic poles 31 and 32 different from each other are formed of semicircular portions in plan view as illustrated in FIG. 3. In movable magnet 30 of the present embodiment, the arc-like curved surfaces of the semicircular portions are magnetization surfaces of magnetic poles 31 and 32 different from each other, which extend in the circumferential direction about the axis. In other words, the magnetization surfaces of magnetic poles 31 and 32 are disposed in a direction orthogonal to the axis direction of shaft 13 such that they can be opposed to magnetic poles 412a and 412b of first core 41a and second core 41b as they are rotated.

The number of magnetic poles of movable magnet 30 is equal to the number of magnetic poles of the core.

Magnetic poles 31 and 32 at the outer peripheral surface of movable magnet 30 are switched at magnetic pole switching part 34 extending along shaft 13.

In a non-energization state of coil 43, magnetic pole switching part 34 of magnetic poles 31 and 32 of movable magnet 30 is located at a position opposite to the centers in the width direction in magnetic poles 412a and 412b of first core 41a and second core 41b. Magnetic pole switching part 34 is disposed at a position where the region in the rotational direction is symmetric with respect to magnetic poles 412a and 412b.

In movable magnet 30, magnetic poles 31 and 32 and magnetic pole switching part 34 are movable about the axis in the circumferential direction along with rotation of shaft 13.

Fixing Body 20

Fixing body 20 pivotally supports shaft 13 to movably support movable member 10.

Fixing body 20 includes base 22, bearings 23a and 23b, magnet position holding part 24, core fixation plate 27, and core unit 40 including coil 43.

In rotary reciprocating drive actuator 1, base 22 turnably pivotally supports shaft 13 of movable member 10. In the present embodiment, base 22 has a shape in which one sides (here, one end portion on the −Y direction side) of one end surface part 222 and the other end surface part 224 are joined at both end portions of main body surface part 226 extending in the axis direction. One end surface part 222 and the other end surface part 224 are spaced away from each other in the axis direction of shaft 13, i.e., the Z direction so as to be opposite to each other. More specifically, in base 22, each of one end surface part 222, the other end surface part 224 and main body surface part 226 is formed in a planar shape, and, in main body surface part 226, one end surface part 222 and the other end surface part 224 opposite to each other are provided upright at both end portions spaced away from each other in the axis direction of shaft 13. That is, base 22 has a substantially U-shape in its entirety in side view.

Cutout holes 222a and 224a facing each other in the axis direction (Z direction) extend through one end surface part 222 and the other end surface part 224, respectively, which are spaced away from each other in the axis direction. Shaft 13 is inserted to cutout holes 222a and 224a through bearings 23a and 23b, respectively.

Mirror 16 is turnably disposed between one end surface part 222 and the other end surface part 224, and mirror 16 is turnable in base 22.

Core unit 40 that is opposite to movable magnet 30 with air gap G therebetween is disposed on the outer surface (here, the left surface) side of one end surface part 222 of base 22 in the axis direction.

Core unit 40 is fixed to core fixation plate 27, and core fixation plate 27 is fixed to the left surface of one end surface part 222 with securing member 28 therebetween.

On the other end surface part 224 side, rotation angle position detection part 70 that detects the rotation angle of shaft 13 is disposed. Rotation angle position detection part 70 of the present embodiment is a so-called light encoder sensor, and includes encoder disk 72 attached to shaft 13, and sensor substrate 76 on which optical sensor 74 that detects the rotation angle of shaft 13 using encoder disk 72 is mounted.

At the other end surface part 224, sensor substrate 76 for mounting optical sensor 74 is disposed. In the present embodiment, sensor substrate 76 is fixed to the other end surface part 224 with securing member 28 such as a screw. Rotation angle position detection part 70 detects the rotation angle of shaft 13, i.e., the rotation angle of mirror 16 by receiving light reflected by encoder disk 72 at the optical sensor 74. In this manner, the sway range of reciprocating rotation drive (sway) of shaft 13 and mirror 16 can be controlled at the control part provided on fixing body 20 side on the basis of the detection result, for example.

Core unit 40 includes coil 43, and core 41 including first core 41a, second core 41b and bridge core 41c where coil 43 is wound.

In the present embodiment, magnet position holding part 24 is provided at bridge core 41c of core unit 40.

Coil 43 excites the core when energized. In the present embodiment, coil 43 is composed of coils 43a and 43b which are wound around bobbin 44. Bobbin 44 is inserted outside core part 411a of first core 41a and core part 411b of second core 41b.

As described above, coils 43a and 43b are disposed at the cores disposed at positions sandwiching movable magnet 30 therebetween. Thus, the size of coil 43 can be reduced, and the balance of the magnetic force generated by coil 43 can be improved.

First core 41a, second core 41b and bridge core 41c are layered cores, and are formed of layered ferritic magnetic stainless-steel sheets, for example.

First core 41a and second core 41b include even number of (here, two) different magnetic poles 412a and 412b that are excited upon energization of coil 43. Note that the number of the magnetic poles of core 41 is even number, and two or more poles may be provided as long as the number is equal to that of magnetic poles 31 and 32 of movable magnet 30.

In the present embodiment, first core 41a and second core 41b include core parts (411a and 411b) that are disposed to sandwich movable magnet 30 therebetween in the direction orthogonal to the rotation axis direction, and are parallel to each other in the direction orthogonal to the rotation axis direction. Bobbin 44 on which coil 43 is wound is inserted outside each of the core parts (411a and 411b). Bridge core 41c bridges one end portions of the core parts (411a and 411b), and magnetic poles 412a and 412b are continuously formed at the other end portions of the core parts (411a and 411b).

Two magnetic poles 412a and 412b are disposed along the rotational direction of movable magnet 30.

In the present embodiment, two magnetic poles 412a and 412b are disposed opposite to each other to sandwich movable magnet 30 with air gap G therebetween in the direction orthogonal to the rotation axis in movable magnet 30 from the outer periphery (corresponding to magnetic poles 31 and 32) of movable magnet 30.

In magnetic poles 412a and 412b, centers of the lengths along the rotational direction of movable magnet 30 (hereinafter referred to as "center position" of each of magnetic poles 412a and 412b) are opposite to each other with the axis of the shaft therebetween.

Magnetic pole switching part 34 of movable magnet 30 is disposed opposite to each of the center positions of magnetic poles 412a and 412b. In the present embodiment, the center positions of magnetic poles 412a and 412b and the axis of shaft 13 are disposed on a straight line in plan view.

In the present embodiment, magnetic poles 412a and 412b are formed in arc-shapes that match the outer peripheral surface of movable magnet 30, and surround movable magnet 30 in the X direction.

Together with first core 41a and second core 41b, bridge core 41c is disposed to surround movable magnet 30 in the direction orthogonal to the rotation axis.

Magnet position holding part 24 disposed opposite to movable magnet 30 with air gap G therebetween and protruded to movable magnet 30 side is attached to bridge core 41c.

Together with movable magnet 30, magnet position holding part 24 functions as a magnet spring using a magnetic attractive force generated between it and movable magnet 30. Magnet position holding part 24 positions and holds rotating movable magnet 30 at an operation reference position (a predetermined rotation angle position).

Magnet position holding part 24 is a magnet or a magnetic substance. In the present embodiment, magnet position holding part 24 is a magnet magnetized toward movable magnet 30 side, and thus increases the magnetic attractive force generated between it and movable magnet 30 in comparison with the case where it is composed of a magnetic substance. The present embodiment adopts a magnet magnetized to movable magnet 30 side.

Magnet position holding part 24 is a magnet, and sets the position of magnetic pole switching part 34 of movable magnet 30 at a position opposite to magnetic poles 412a and 412b at the operation reference position in the present embodiment. In this manner, magnet position holding part 24 and movable magnet 30 attract each other, and thus movable magnet 30 can be set at the operation reference position. In this manner, magnetic pole switching part 34 of movable magnet 30 are opposite to the center positions of magnetic poles 412a and 412b of first core 41a and second core 41b. In this manner, movable magnet 30 is stabilized at the operation reference position, and, at that position, coil 43 (43a, 43b) is energized so as to generate a maximum torque and to drive movable member 10.

In addition, since movable magnet 30 is magnetized in two poles, a high amplitude is readily generated in cooperation with coil 43, and improvement in vibration performance can be achieved.

Magnet position holding part 24 includes an opposing surface that is opposite to the outer peripheral surface of movable magnet 30 with air gap G therebetween. The opposing surface is a curved surface that matches the shape of the outer peripheral surface of movable magnet 30.

Magnet position holding part 24 is formed in a protruding shape that protrudes from bridge core 41c toward movable magnet 30, and the end surface thereof serves as the opposing surface.

Magnet position holding part 24 is a magnet whose opposing surface is magnetized in an N pole (see FIGS. 8 and 9), for example.

On the outside of movable magnet 30 in the radial direction, the opposing surface of magnet position holding part 24 serving as the magnetic pole is opposite to a portion along the rotational direction of movable magnet 30 between the portions of the outer peripheral surface of movable magnet 30 opposite to magnetic poles 412a and 412b of first core 41a and second core 41b.

In the case where magnet position holding part 24 is a magnetic substance, it may be integrally formed with bridge core 41c. With this configuration, a function of a magnet spring can be favorably achieved with fewer components.

In movable magnet 30 at the operation reference position, one magnetic pole of movable magnet 30 is opposite to magnet position holding part 24, and magnetic pole switching part 34 of the magnetic pole of movable magnet 30 is opposite to the center positions of magnetic poles 412a and 412b of first core 41a and second core 41b.

In the present embodiment, core 41 configured to be excited by coil 43 is composed of first core 41a including a magnetic pole 412a, second core 41b including magnetic pole 412b, and core 41c that bridges the end portions on the side opposite to magnetic poles 412a and 412b of first core 41a and second core 41b. That is, core 41 is composed of three separate members. Of these separate members, bridge core 41c is provided in magnet position holding part 24. In this manner, in core 41, the core part where magnet position holding part 24 is disposed is a separate member, and thus ease of mounting between coil 43, core 41, and movable magnet 30 can be increased so as to improve the assemblability in comparison with magnet position holding part 24 is integrally formed with a core including a portion where coil 43 is wound.

Figure 4:
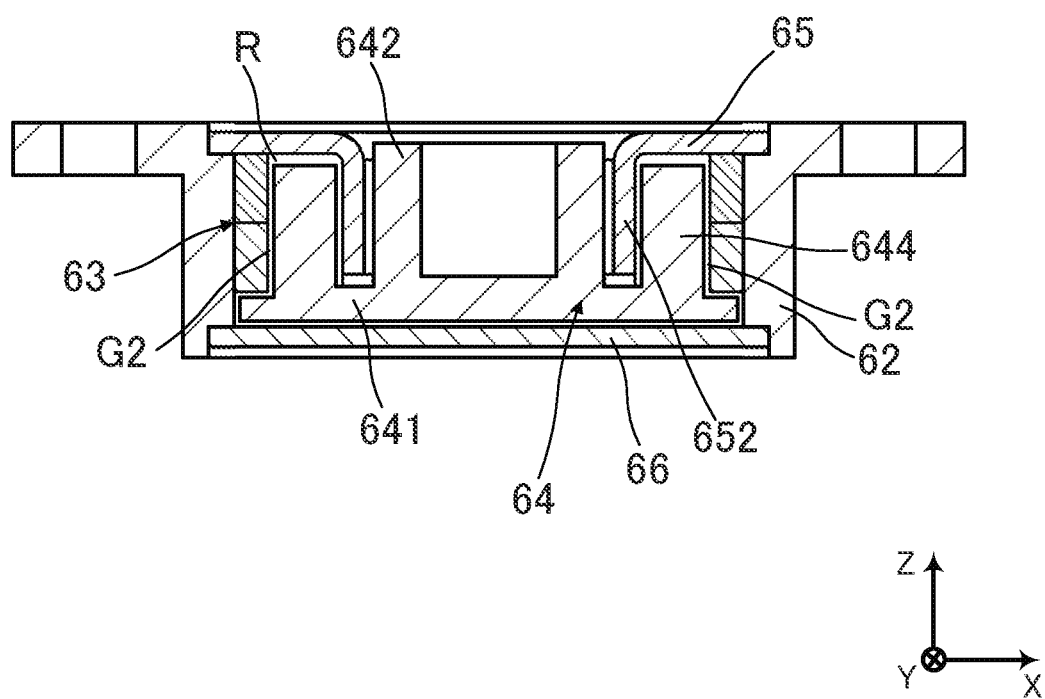
FIG. 4 is a longitudinal sectional view illustrating an attenuation part of the rotary reciprocating drive actuator according to Embodiment 1 of the present invention.
Figure 5:
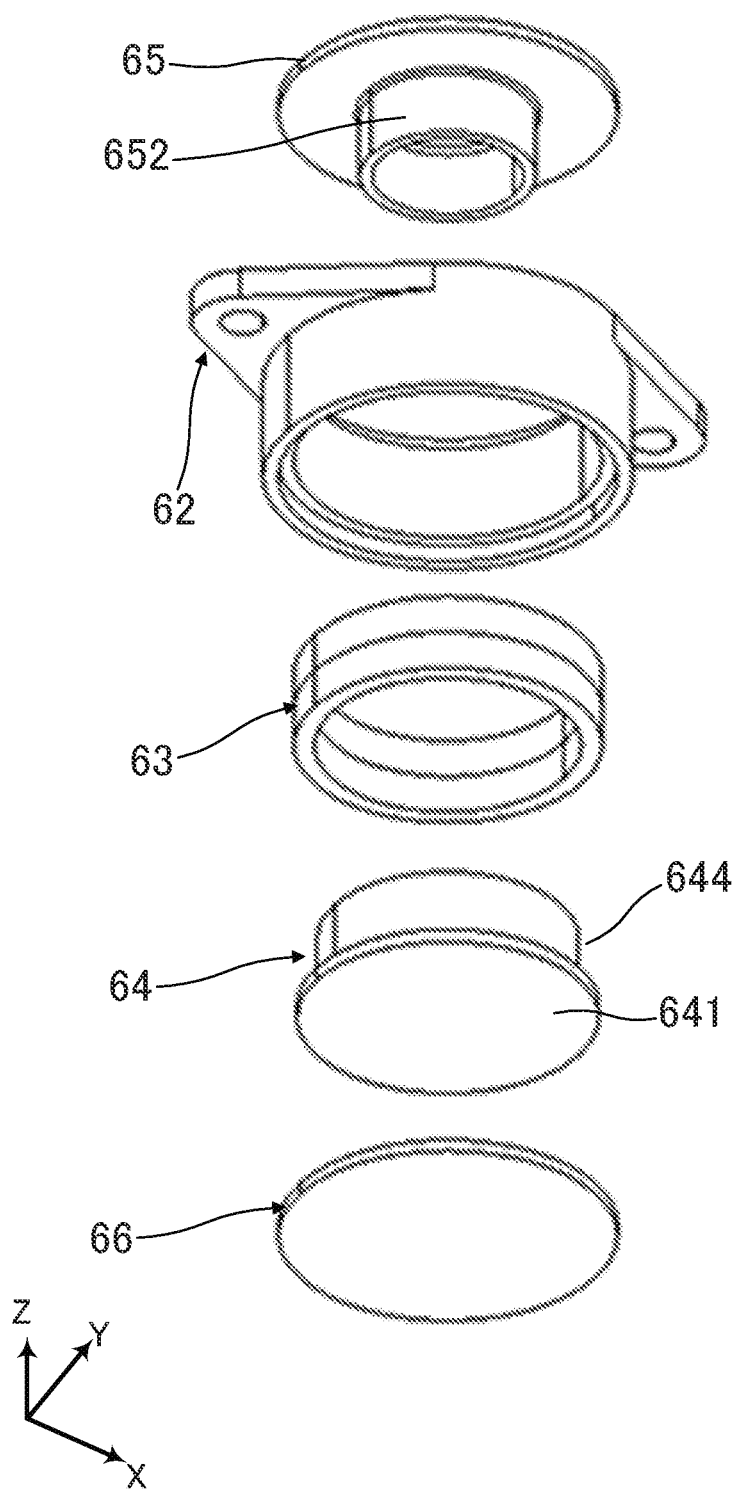
FIG. 5 is an exploded perspective view illustrating the attenuation part of the rotary reciprocating drive actuator according to Embodiment 1 of the present invention.

FIG. 4 is a longitudinal sectional view illustrating an attenuation part of the rotary reciprocating drive actuator according to Embodiment 1 of the present invention, and FIG. 5 is an exploded perspective view illustrating an attenuator of the rotary reciprocating drive actuator according to Embodiment 1 of the present invention.

When a sharp resonance is generated when movable member 10 is driven into reciprocating rotation upon energization of coil 43, the attenuation part attenuates the sharp resonance. In the present embodiment, attenuator 60 serving as an attenuation part is provided between shaft 13 and base 22, and attenuates a resonance by applying a load to a rotation of shaft 13.

Attenuator 60 includes case 62 fixed to base 22, magnet 63, rotational body 64 turnably disposed in case 62 and fixed to shaft 13, upper closure part 65, and lower closure part 66, for example.

Case 62 is a cylindrical member in which ring-shaped magnet 63 is attached along the circumferential direction on the inner peripheral surface. Inside magnet 63, rotational body 64 is disposed with air gap G2 therebetween.

Rotational body 64 is a magnetic substance and includes disk part 641, recess 642 protruding from the center of disk part 641, and outer cylindrical part 644 concentrically disposed on the outer periphery side of recess 642 and protruding from the outer edge side of disk part 641. In recess 642 of rotational body 64, the other end portion of 13b of shaft 13 is inserted and fixed. Inside case 62, outer cylindrical part 644 is disposed so as to be circumferentially movable between magnet 63 and inner cylindrical part 652 of upper closure part 65.

The bottom surface side of case 62 is closed with lower closure part 66, and the top surface side of case 62 is closed with ring-shaped upper closure part 65 in the state where the opening edge of recess 642 provided at the center of rotational body 64 is exposed while preventing removal of rotational body 64 from case 62. At the flange on the top surface side of case 62, attenuator 60 is fixed to the other end surface part 224 with securing member 29 such as a screw (see FIG. 2). In the present embodiment, case 62 is fixed to a boss (not illustrated) protruding to the outer surface side with securing member 29 on the other end surface part 224, and attenuator 60 is disposed to sandwich rotation angle position detection part 70 between attenuator 60 and the other end surface part 224.

In case 62, magnetic fluid R is provided between magnet 63 and rotational body 64, and between inner cylindrical part 652 of upper closure part 65 and rotational body 64.

Figure 6A:
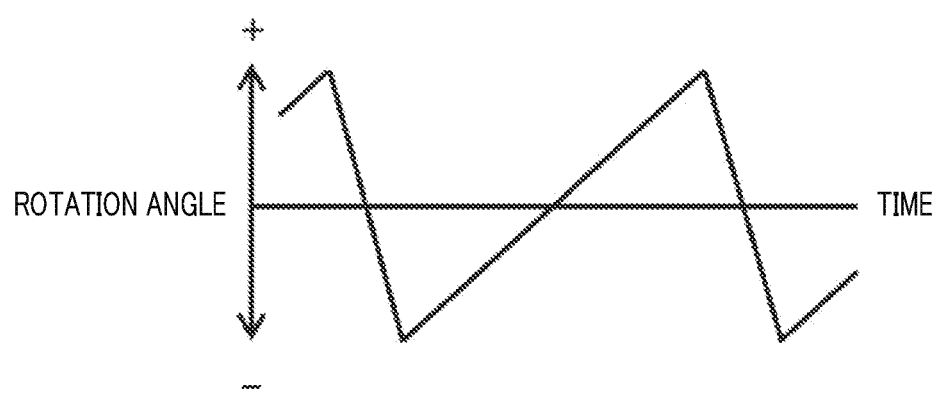
FIG. 6A is a diagram illustrating a waveform illustrating a state where ringing is suppressed by a function of the attenuation part.
Figure 6B:
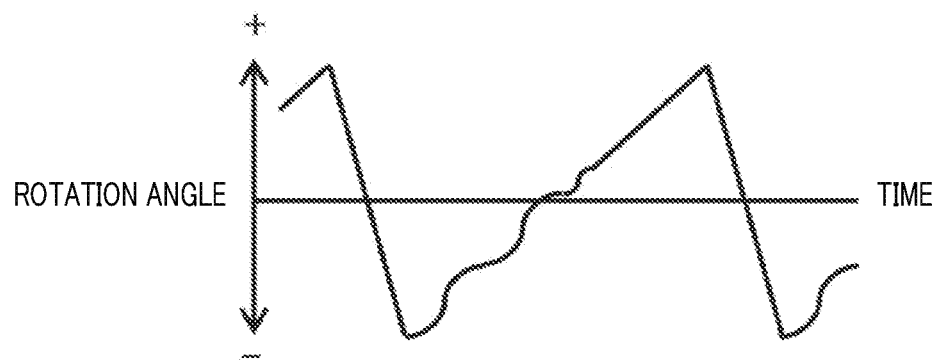
FIG. 6B is a diagram illustrating a waveform with ringing.

When movable member 10 is driven into reciprocating rotation, rotational body 64 fixed to the other end portion of 13b of shaft 13 makes contact with magnetic fluid R in case 62, and thus attenuator 60 is driven into reciprocating rotation while applying a load by magnetic fluid R with the magnetic attractive force of magnet 63. With this configuration, it is possible to suppress the ringing illustrated in FIG. 6B that is generated due to a sharp resonance when movable member 10 is in a movable state, and thus easy-to-control-vibration can be achieved through driving in a suitable waveform with no ringing, or a so-called saw wave as illustrated in FIG. 6A. In addition, attenuator 60 of the present embodiment can achieve improvement of the reliability as attenuator 60 with the configuration in which magnetic fluid R is interposed between rotational body 64 and case 62 side and magnet 63 prevents leakage of magnetic fluid R to the outside of attenuator 60.

Note that in rotary reciprocating drive actuator 1 of the present embodiment, attenuator 60 serving as an attenuation part is a so-called rotary damper in which magnetic fluid R is interposed between rotational body 64 and case 62 on the fixing body side, fluid that attenuates the rotational force of rotational body 64 with respect to case 62 may be used instead of magnetic fluid R. That is, attenuator 60 may have any configuration as long as it attenuates the rotation of rotational body 64 connected to movable member 10 and the sharp resonance generated by movable member 10 driven into reciprocating rotation.

For example, attenuator 60 may have a configuration in which magnet 63 is removed and the sealing property of case 62, upper closure part 65 and lower closure part 66 is increased with a sealant, and, oil is used instead of magnetic fluid R.

This configuration eliminates the need for magnet 63 in attenuator 60, and can achieve the downsizing of the attenuator itself while achieving improvement in assemblability.

In addition, the magnetic fluid itself may be provided as the attenuation part and may be disposed in air gap G between movable magnet 30 and magnetic poles 412a and 412b, or in air gap G between movable magnet 30 and magnet position holding part 24. With this configuration, it is not necessary to use a rotary damper such as attenuator 60 of the present embodiment as a separate component. In addition, by applying magnetic fluid to portions sandwiching air gap G at movable magnet 30 and magnetic poles 412a and 412b, or portions sandwiching air gap G at movable magnet 30 and magnet position holding part 24, magnetic fluid can be easily disposed at air gap G to achieve the attenuation function for attenuating resonance at low cost and with a reduced space.

Figure 7:
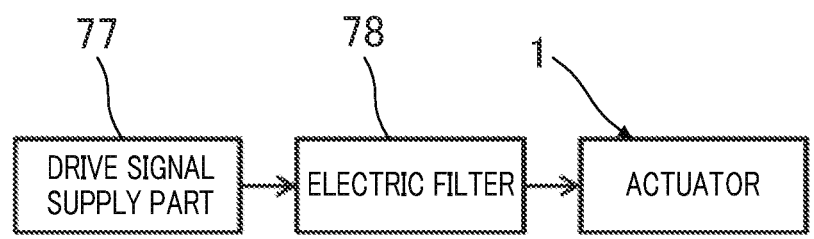
FIG. 7 is a diagram illustrating a modification of the attenuation part.

In addition, to remove frequency component where ringing is generated, electric filter 78 such as a low-pass filter, a bandlimited filter, and a notch filter may be provided as the attenuation part between the power supply part (drive signal supply part 77) that supplies a drive signal to rotary reciprocating drive actuator 1 and rotary reciprocating drive actuator 1 as illustrated in FIG. 7, for example. Note that electric filter 78 is mounted to a driving substrate not illustrated that drives coil 43 and the driving substrate is provided to fixing body 20.

By attenuating resonance with electric filter 78, ringing can be favorably suppressed without being affected by the temperature, individual differences of components, and the like in comparison with a mechanical attenuation structure.

Magnetic Circuit Configuration of Rotary Reciprocating Drive Actuator 1

Figure 8:
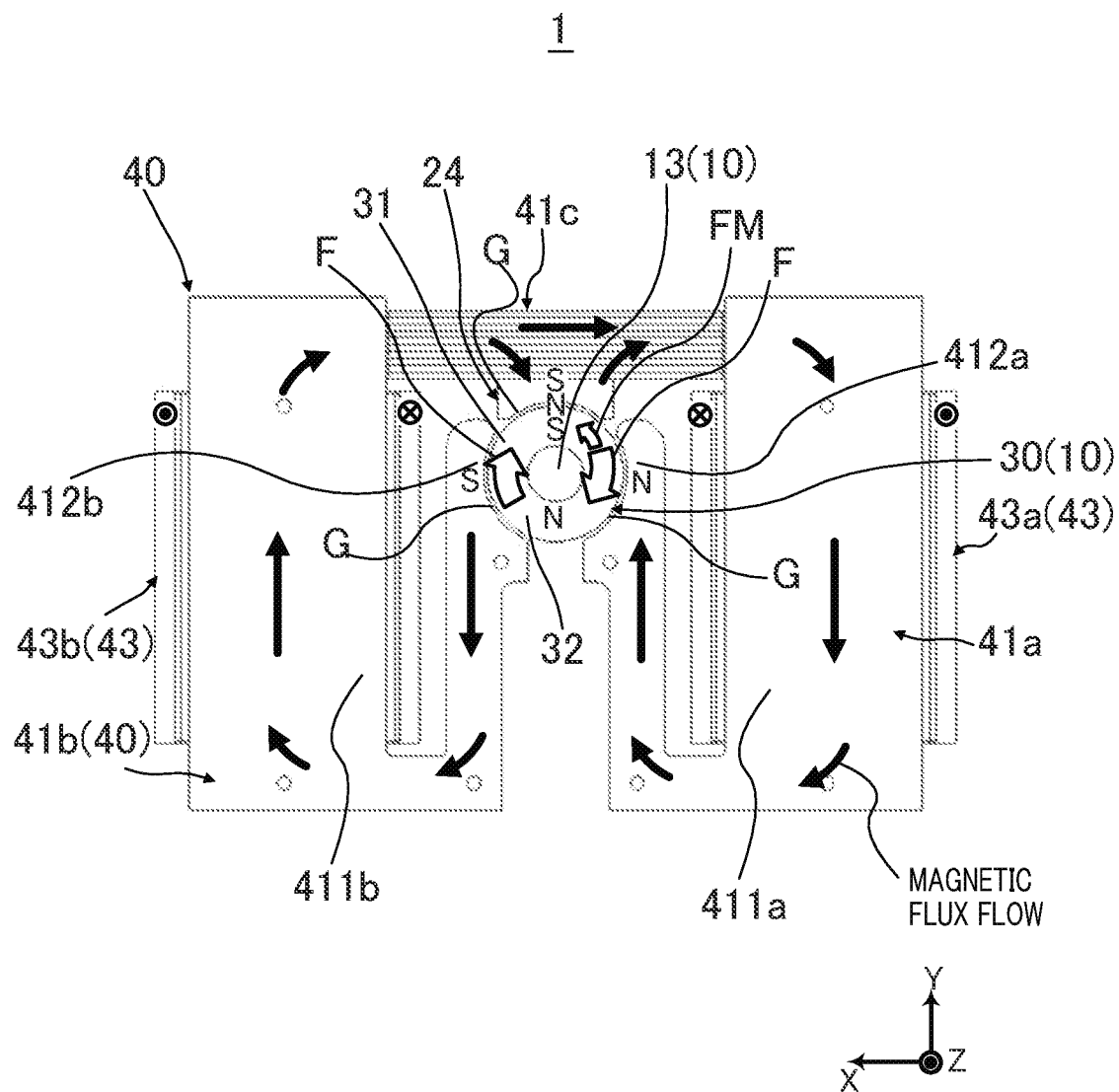
FIG. 8 is a diagram illustrating an operation of the rotary reciprocating drive actuator by the magnetic circuit of the rotary reciprocating drive actuator according to Embodiment 1 of the present invention.
Figure 9:
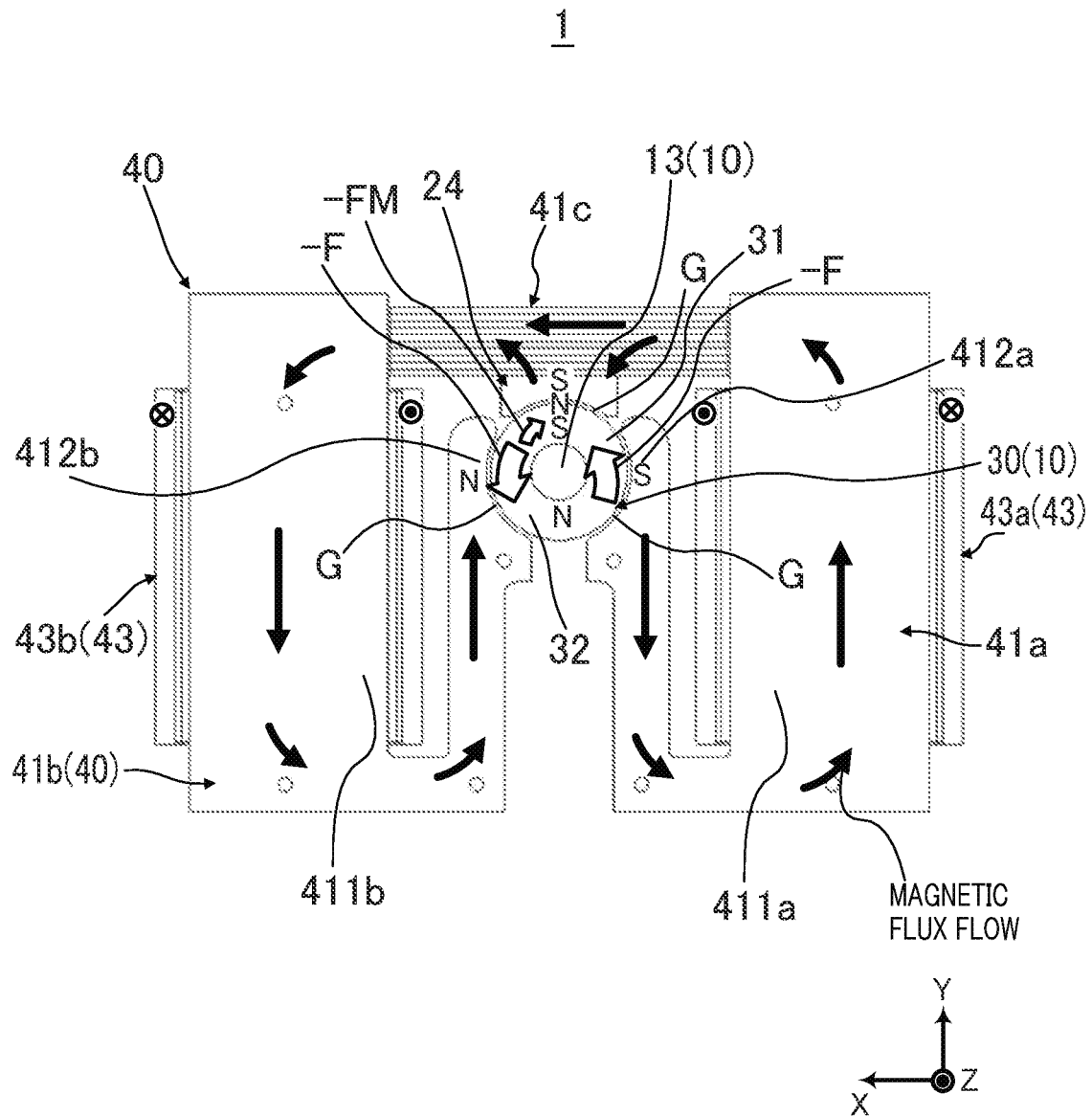
FIG. 9 is a diagram illustrating an operation of the rotary reciprocating drive actuator by the magnetic circuit of the rotary reciprocating drive actuator according to Embodiment 1 of the present invention.

FIGS. 8 and 9 illustrate an operation of the rotary reciprocating drive actuator by the magnetic circuit of the rotary reciprocating drive actuator according to Embodiment 1 of the present invention. FIG. 9 is a diagram illustrating an operation of the rotary reciprocating drive actuator in the case where the energization direction to the coil is reversed in FIG. 8.

In rotary reciprocating drive actuator 1, in a non-energization state of coil 43, movable magnet 30 is located at the operation reference position (predetermined rotation angle position) with the magnetic attractive force of magnet position holding part 24 and movable magnet 30, i.e., a magnet spring.

In a normal state, i.e., at the operation reference position, one of magnetic poles 31 and 32 of movable magnet 30 is attracted by magnet position holding part 24 such that magnetic pole switching part 34 is located opposite to the center positions of magnetic poles 412a and 412b of first core 41a and second core 41b.

As illustrated in FIG. 8, in magnet position holding part 24, in a configuration in which the opposing surface opposite to movable magnet 30 is magnetized to N pole, a magnet spring torque that rotates movable magnet 30 (the arrow FM in FIG. 8) is generated such that it is mutually attracted with magnetic pole 32 magnetized to the S pole of movable magnet 30, for example.

In this manner, rotary reciprocating drive actuator 1 of the present embodiment is disposed at a position such that in a normal state, i.e., a state where movable magnet 30 is located at the operation reference position, magnetic pole switching part 34 of movable magnet 30 (specifically, both end portions of linear magnetic pole switching part 34) faces magnetic poles 412a and 412b of first core 41a and second core 41b. With this configuration, when coil 43 is energized, movable member 10 can be driven in a desired rotational direction with the excitation of coil 43 in accordance with the energization direction of coil 43, and the torque that drives movable member 10 into rotation can be maximized.

Coil 43 is wound such that when energized, coil 43 (43a, 43b) excites first core 41a and second core 41b such that magnetic poles 412a and 412b of first core 41a and second core 41b have different polarities.

In the present embodiment, when coil 43 (43a, 43b) is energized in the direction illustrated in FIG. 8, coil 43 (43a, 43b) excites first core 41a and second core 41b such that magnetic pole 412a is magnetized in the N pole and magnetic pole 412b is magnetized in the S pole.

Specifically, energized coils 43a and 43b magnetize respective wound core parts (411a and 411b). At first core 41a, a magnetic flux is generated which is emitted from magnetic pole 412a in N pole to movable magnet 30 so as to reach core part 411a through movable magnet 30, magnet rotation position holding part 24, and bridge core 41c in this order, for example.

In addition, at second core 41b, a magnetic flux is generated which is emitted from core part 411b to bridge core 41c side so as to reach magnetic pole 412b through bridge core 41c, magnet rotation position holding part 24, and movable magnet 30 in this order.

With this configuration, magnetic pole 412a magnetized in N pole and the S pole of movable magnet 30 are attracted with each other, and magnetic pole 412b magnetized in S pole and the N pole of movable magnet 30 are attracted with each other such that a torque in F direction about the axis of shaft 13 is generated at movable magnet 30 to rotate it in the F direction. Accordingly, shaft 13, and mirror 16 fixed to shaft 13 are also rotated.

In addition, when the energization direction of coil 43 is reversed, magnetic poles 412a and 412b of first core 41a and second core 41b excited by coil 43 are magnetized in magnetic poles different from the case of the above-described energization direction of coil 43. More specifically, when energized in the direction different from the energization direction illustrated in FIG. 8 (see FIG. 9), magnetic pole 412a is magnetized in S pole, and magnetic pole 412b is magnetized in N pole, and, the flow of the magnetic flux is reversed. At the time when the energization direction is switched, the magnetic attractive force, i.e., a magnet spring, between magnet rotation position holding part 24 and movable magnet 30 generates magnet spring torque FM and thus movable magnet 30 moves to the operation reference position.

With this configuration, as illustrated in FIG. 9, magnetic pole 412a magnetized in S pole and the N pole of movable magnet 30 are attracted with each other, and pole magnetic pole 412b magnetized in N and the S pole of movable magnet 30 are attracted with each other such that a torque in a direction (−the F direction) opposite to the F direction about shaft 13 is generated at movable magnet 30 so as to rotate movable magnet 30 in the direction opposite to the F direction. Accordingly, shaft 13 is also rotationally moved in the opposite direction (−the F direction), and mirror 16 fixed to shaft 13 is also rotated in the opposite direction (−the F direction). By repeating this operation, mirror 16 is driven into reciprocating rotation.

In this manner, rotary reciprocating drive actuator 1 is driven by alternating current wave input from a power supply part (e.g., a power supply part having a function similar to that of drive signal supply part 77 of FIG. 7) to coil 43. That is, the energization direction of coil 43 is cyclically switched such that the thrust of the torque in the F direction about the axis and the thrust of the torque in the direction opposite to the F direction (−the F direction) alternately act on movable member 10. In this manner, movable member 10 is driven into reciprocating rotation, i.e., vibration, about shaft 13. Note that at the time of switching when the thrust of the torque in the F direction and the thrust of the torque in −the F direction alternately act on movable member 10, magnet spring torques FM and −FM act in the movement of movable member 10 to the operation reference position.

The drive principle of rotary reciprocating drive actuator 1 is briefly described below. In rotary reciprocating drive actuator 1 of the present embodiment, when the inertia moment J of movable member 10 is represented by [kg·m$^2$] and the spring constant in the twisting direction of the magnet spring (magnetic poles 412a and 412b, magnet position holding part 24 and movable magnet 30) is represented by $K_{sp}$, movable member 10 is vibrated with respect to fixing body 20 at resonance frequency $F_r$ [Hz] that is calculated by Equation (1).

$$Fr = \frac{1}{2\pi}\sqrt{\frac{K_{sp}}{J}} \qquad \text{Equation 1}$$

Fr: resonance frequency [Hz]
J: inertia moment [kg·m²]
$K_{sp}$: spring constant [N·m/rad]

Movable member 10 serves as a mass part of a vibration model in a spring-mass system, and is brought into a resonance state when an alternating current wave having a frequency equal to resonance frequency Fr of movable member 10 is input to coil 43. That is, by inputting an alternating current wave having a frequency substantially equal to resonance frequency Fr of movable member 10 from the power supply part to coil 43, movable member 10 can be efficiently vibrated.

An equation of motion and a circuit equation that indicate drive principle of rotary reciprocating drive actuator 1 are as follows. Rotary reciprocating drive actuator 1 is driven based on the equation of motion of the following Equation (2) and the circuit equation of the following Equation (3).

$$J\frac{d^2\theta(t)}{dt^2} = K_t i(t) - K_{sp}\theta(t) - D\frac{d\theta(t)}{dt} - T_{Loss} \quad \text{Equation 2}$$

J: inertia moment [kg·m2]
θ(t): angle [rad]
$K_t$: torque constant [N·m/A]
i(t): current [A]
$K_{sp}$: spring constant [N·m/rad]
D: attenuation coefficient [N·m/(rad/s)]
$T_{Loss}$: load torque [N·m]

$$e(t) = Ri(t) + L\frac{di(t)}{dt} + K_e\frac{d\theta(t)}{dt} \quad \text{Equation 3}$$

e(t): voltage [V]
R: resistance [Ω]
L: inductance [H]
$K_e$: counter electromotive force constant [V/(rad/s)]

That is, inertia moment J [kg·m2], rotation angle θ (t) [rad], torque constant Kt [N·m/A], current i(t) [A], spring constant $K_{sp}$ [N·m/rad], attenuation coefficient D [N·m/(rad/s)], load torque $T_{Loss}$ [N·m] and the like of movable member 10 in rotary reciprocating drive actuator 1 may be appropriately changed within a range satisfying Equation (2). In addition, voltage e(t) [V], resistance R [Ω], inductance L [H], counter electromotive force constant $K_e$ [V/(rad/s)] may be appropriately changed within a range satisfying Equation (3).

As described above, in rotary reciprocating drive actuator 1, when coil 43 is energized with an alternating current wave corresponding to resonance frequency Fr determined by inertia moment J of movable member 10 and spring constant $K_{sp}$ of the magnet spring, a large vibration output can be efficiently obtained.

According to the rotary reciprocating drive actuator of the present embodiment, high torque generation efficiency, suppressed heat transfer to the mirror serving as the movable object, and accurate flatness of reflecting surface 16a of mirror 16 can be ensured. In addition, it is possible to achieve high manufacturability, high assembly accuracy, and driving at a high amplitude even when the movable object is a large mirror.

Note that rotary reciprocating drive actuator 1 of Embodiment 1 and rotary reciprocating drive actuators 1A, 1B and 1C described later enable resonance driving and non-resonance driving. In addition, ringing can be suppressed by increasing the attenuation coefficient with the attenuation part.

Embodiment 2

Figure 10:
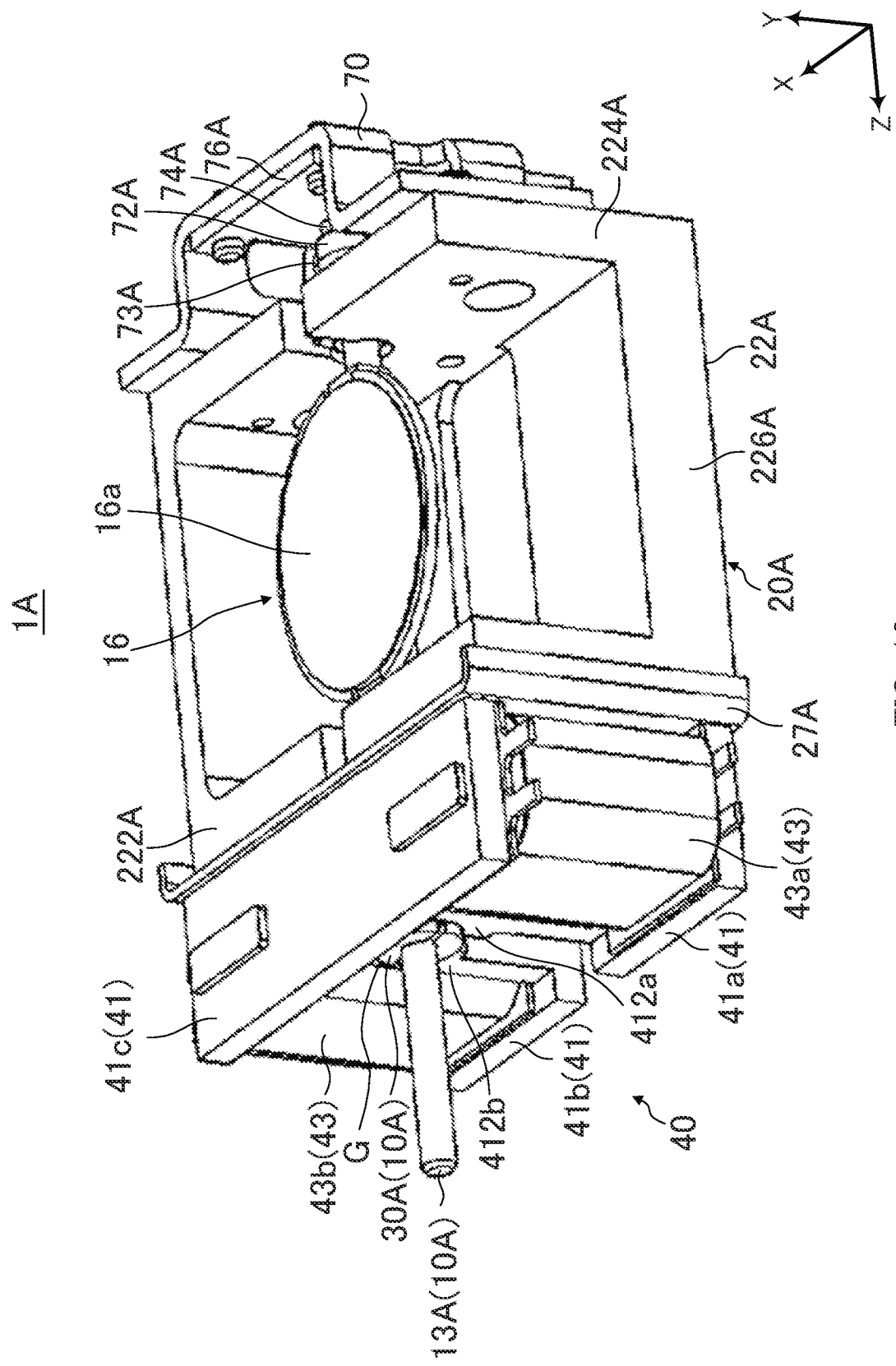
FIG. 10 is a perspective view of an external appearance of a rotary reciprocating drive actuator according to Embodiment 2 of the present invention.
Figure 11:
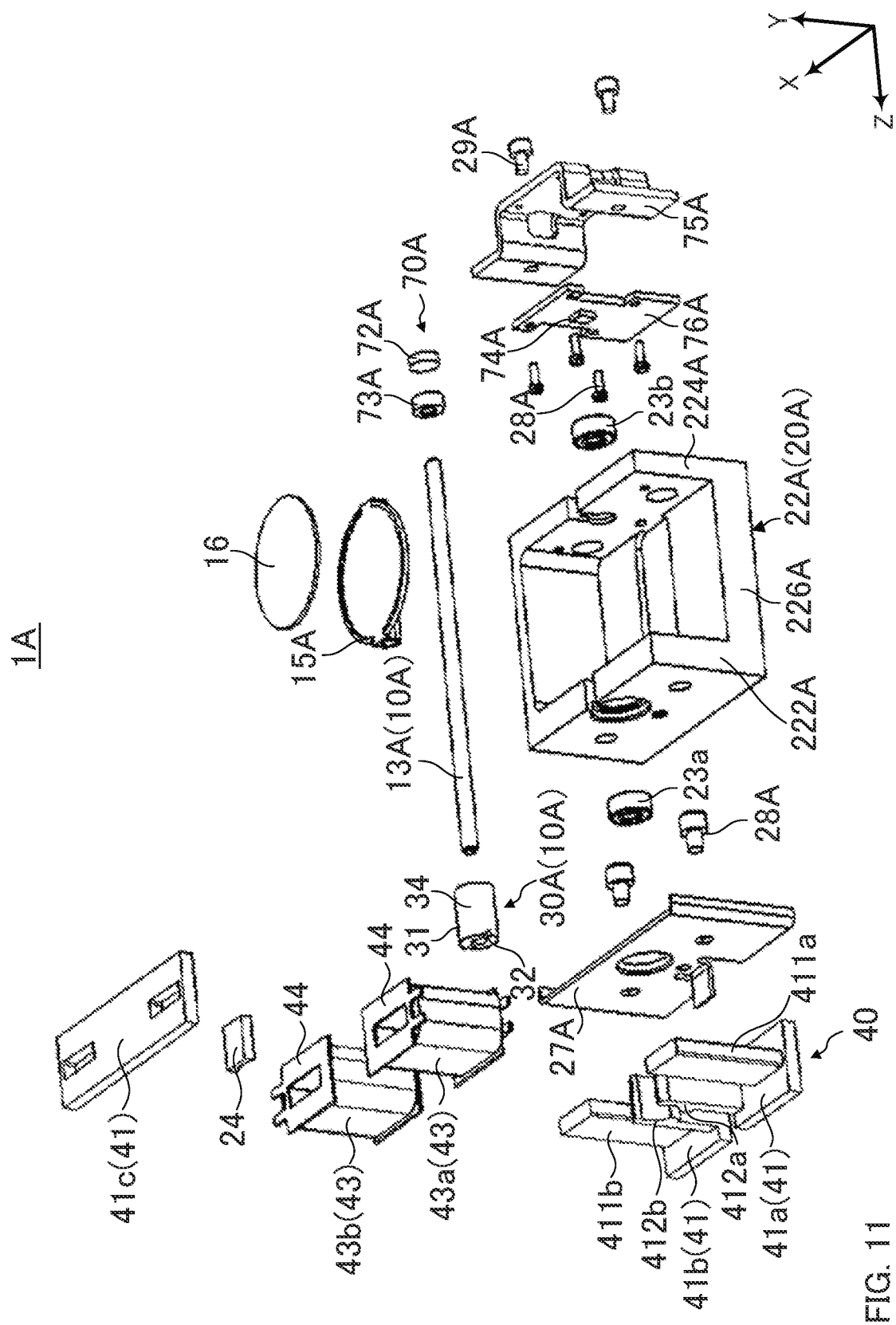
FIG. 11 is an exploded perspective view of the rotary reciprocating drive actuator according to Embodiment 2 of the present invention.

FIG. 10 is a perspective view of an external appearance of rotary reciprocating drive actuator 1A according to Embodiment 2 of the present invention, and FIG. 11 is an exploded perspective view of rotary reciprocating drive actuator 1A according to Embodiment 2 of the present invention.

Rotary reciprocating drive actuator 1A illustrated in FIGS. 10 and 11 has a configuration in which a magnetic sensor is used instead of the optical sensor as rotation angle position detection part 70 in the configuration of rotary reciprocating drive actuator 1, and other configurations are the same of those of rotary reciprocating drive actuator 1. The components of rotary reciprocating drive actuator 1A that are the same as those of the components of rotary reciprocating drive actuator 1 are denoted with the same names and reference numerals and descriptions thereof will be omitted.

Rotary reciprocating drive actuator 1A includes movable member 10A including movable magnet 30A and shaft 13A, and fixing body 20A that rotatably supports shaft 13A and includes coil 43 and magnet position holding part 24. In rotary reciprocating drive actuator 1A, movable magnet 30A of movable member 10A has a ring shape with even-numbered magnetic poles alternately magnetized in S poles and N poles at the outer periphery of shaft 13A. Two magnetic poles 412a and 412b of core 41 of fixing body 20A are disposed opposite to each other with air gap G between movable magnet 30A and them on the outer periphery side of shaft 13A. In addition, the number of magnetic poles of core 41 and the number of magnetic poles of movable magnet 30A are equal to each other.

In rotary reciprocating drive actuator 1A, with a magnetic attractive force, or so-called a magnet spring between magnet position holding part 24 and movable magnet 30A, movable member 10A is turnably held by fixing body 20A such that it is located at the operation reference position in a normal state. Here, in the normal state, coil 43 is not energized. The state where movable member 10A is located at the operation reference position is a state where movable magnet 30A is located at a neutral position with respect to the magnetic pole excited by coil 43, where magnetic pole switching part 34 of movable magnet 30A is opposite to the magnetic pole of coil 43 side.

In addition to shaft 13A and movable magnet 30A fixed to shaft 13A, movable member 10A includes magnetic sensor magnet 72A configured to be sensed by magnetic sensor 74A of rotation angle position detection part 70A.

Mirror 16 is fixed to shaft 13A through mirror holder 15A.

Fixing body 20A includes base 22A, bearings 23a and 23b, magnet position holding part 24, core fixation plate 27A, and core unit 40 including coil 43.

Base 22A has a shape in which one end surface part 222A and the other end surface part 224A spaced away from and opposite to each other in the axis direction (Z direction) are joined with main body surface part 226A extending in the axis direction. Note that core fixation plate 27A to which core unit 40 is fixed is fixed to one end surface part 222A of base 22A through securing member 28A such as a screw.

In base 22A, bearings 23a and 23b are fit in cutout parts of one end surface part 222A and the other end surface part 224A. Shaft 13A is inserted in bearings 23a and 23b, and shaft 13A is turnably pivotally supported by base 22A through bearings 23a and 23b.

The other end surface part 224A turnably supports shaft 13A at the outside in the axis direction.

Rotation angle position detection part 70A is disposed on the outside in the axis direction of the other end surface part 224A.

Rotation angle position detection part 70A includes magnetic sensor magnet 72A, magnetic sensor 74A, and sensor substrate 76A to which magnetic sensor 74A is mounted.

Magnetic sensor magnet 72A is integrally fixed, through holder 73A, to the end surface of the other end portion of 13b of shaft 13A protruding outward in the axis direction from the other end surface part 224A.

When driven, magnetic sensor 74A senses magnetic sensor magnet 72A that rotates together with shaft 13A to detect the rotation angles of mirror 16 and shaft 13A. Sensor substrate 76A is fixed to fixing member 75A through securing member 28A such as a screw. Fixing member 75A is fixed to the other end surface part 224A through securing member 29A such as a screw. With this configuration, at the other end surface part 224A, magnetic sensor 74A is disposed at a position that is opposite to magnetic sensor magnet 72A in the axis direction. Sensor substrate 76A enables feedback to a power supply part (e.g., a power supply part having a function similar to that of drive signal supply part 77 of FIG. 7) about the rotation angle, i.e., the position corresponding to the rotation angle, of shaft 13A acquired by magnetic sensor 74A that is driven.

In the present embodiment, the same basic operational effect as those of rotary reciprocating drive actuator 1 can be achieved with a simpler structure and a reduced product cost in comparison with the case where an optical sensor is used.

Embodiment 3

Figure 12:
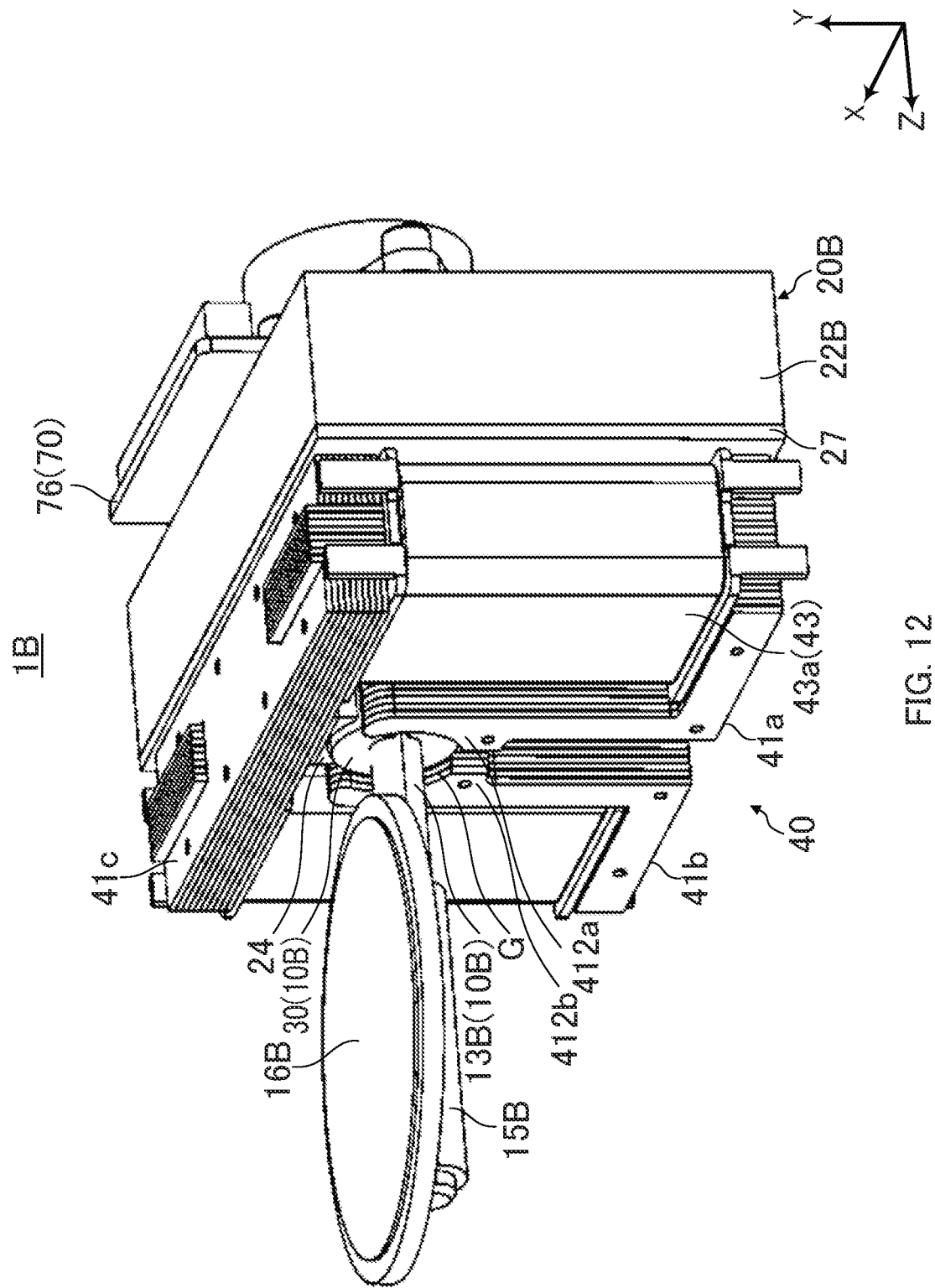
FIG. 12 is a perspective view of an external appearance of a rotary reciprocating drive actuator according to Embodiment 3 of the present invention.
Figure 13:
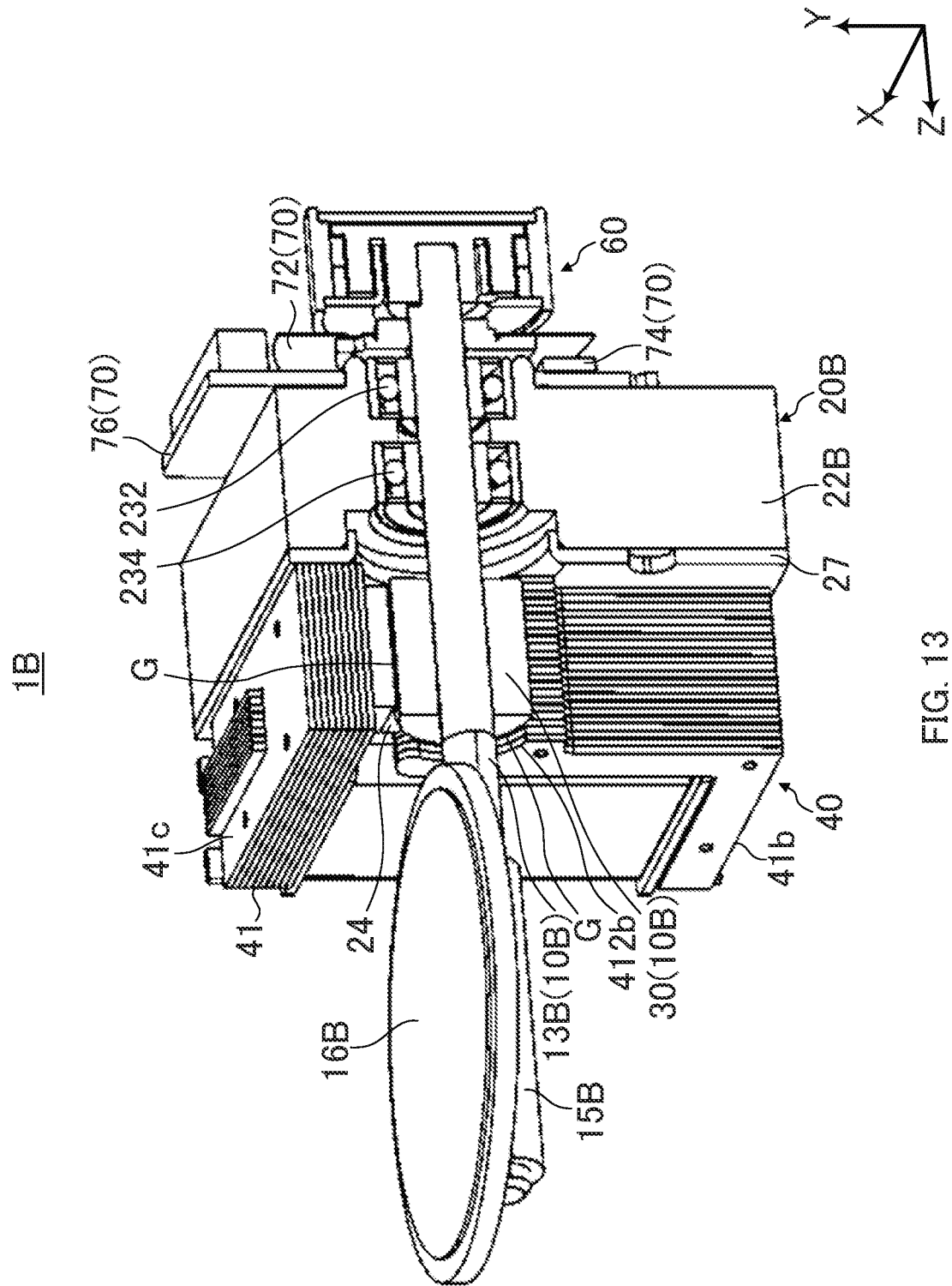
FIG. 13 is a longitudinal sectional view illustrating a configuration of a main part of the rotary reciprocating drive actuator according to Embodiment 3 of the present invention.

FIG. 12 is a perspective view of an external appearance of rotary reciprocating drive actuator 1B according to Embodiment 3 of the present invention, and FIG. 13 is a longitudinal sectional view illustrating a configuration of a main part of rotary reciprocating drive actuator 1B according to Embodiment 3 of the present invention.

Rotary reciprocating drive actuator 1B illustrated in FIGS. 12 and 13 has the same magnetic circuit configuration as those of rotary reciprocating drive actuator 1 with mirror 16B fixed at one end portion of shaft 13B, and is pivotally supported by base 22B on the other end portion 13b side of shaft 13B. Note that also in rotary reciprocating drive actuator 1B, ring-shaped movable magnet 30 in movable member 10B is provided with even-numbered magnetic poles alternately magnetized in S poles and N poles at the outer periphery of shaft 13B, and two magnetic poles 412a and 412b of fixing body 20B equal to the number of magnetic poles of movable magnet 30 are disposed opposite to each other with air gap G between movable magnet 30 and them on the outer periphery side of shaft 13B.

Rotary reciprocating drive actuator 1B is configured to drive mirror 16B into reciprocating rotation with a so-called pivot structure.

More specifically, in movable member 10B including shaft 13B and movable magnet 30 fixed to shaft 13B, encoder disk 72 and scanning mirror 16B are fixed to shaft 13B. Scanning mirror 16B is fixed to shaft 13B through mirror holder 15B.

In fixing body 20B including core unit 40, bearings 232 and 234 are adjacently fit in a penetrating part formed in base 22B for insertion to bearings 232 and 234.

Base 22B is a plate-shaped base disposed on the XY plane, and core unit 40 is fixed at one end surface (left side surface) of base 22B through core fixation plate 27.

Rotation angle position detection part 70 is disposed at the other end surface (right side surface) of base 22B, i.e., the surface opposite to the surface at which core unit 40 is provided in base section 22B. Sensor substrate 76 and encoder disk 72 attached to shaft 13B are disposed on the other end surface (right side surface) side of base 22B, and the rotation angle of shaft 13B can be detected using optical sensor 74 opposite to encoder disk 72. In addition, attenuator 60 located on the right side than rotation angle position detection part 70 is provided on the right side surface side of base 22B.

The other end portion 13b of shaft 13B inserted in base 22B through bearings 232 and 234 is joined rotational body 64 of attenuator 60 having the same configuration as that of Embodiment 1 (see FIGS. 6 and 7).

In this manner, in rotary reciprocating drive actuator 1B, mirror 16B is fixed on one end side of shaft 13B, and the other end side of shaft 13B is supported by base 22B so as to be rotatable back and forth. At shaft 13B in base 22B, movable magnet 30 is fixed on one end surface side of base 22B, and encoder disk 72 of rotation angle position detection part 70 and the rotational body of attenuator 60 are fixed on the other end surface side of base 22B through bearings 234 and 232.

Encoder disk 72 is disposed next to bearing 234, and rotary reciprocating drive actuator 1B can drive mirror 16B into reciprocating rotation in such a manner that the length of shaft 13B fixed to mirror 16B is shorter than shaft 13 of rotary reciprocating drive actuator 1 of Embodiment 1.

In rotary reciprocating drive actuator 1B, mirror 16B is fixed at one end portion 13a of shaft 13B, and the other end portion 13b of shaft 13B is pivotally supported by bearings 232 and 234. With this configuration, mirror 16B, movable magnet 30, bearings 232 and 234 disposed along shaft 13B can be sequentially disposed next to each other, and rotary reciprocating drive actuator 1B can be downsized in comparison with a configuration in which bearings 232 and 234 are disposed apart from each other. According to rotary reciprocating drive actuator 1B, high torque generation efficiency, suppressed heat transfer to the mirror serving as the movable object, and accurate flatness of reflecting surface 16B of mirror 16 can be ensured as with rotary reciprocating drive actuator 1. In addition, it is possible to achieve high manufacturability, high assembly accuracy, and driving of mirror 16B at a high amplitude.

Embodiment 4

Figure 14:
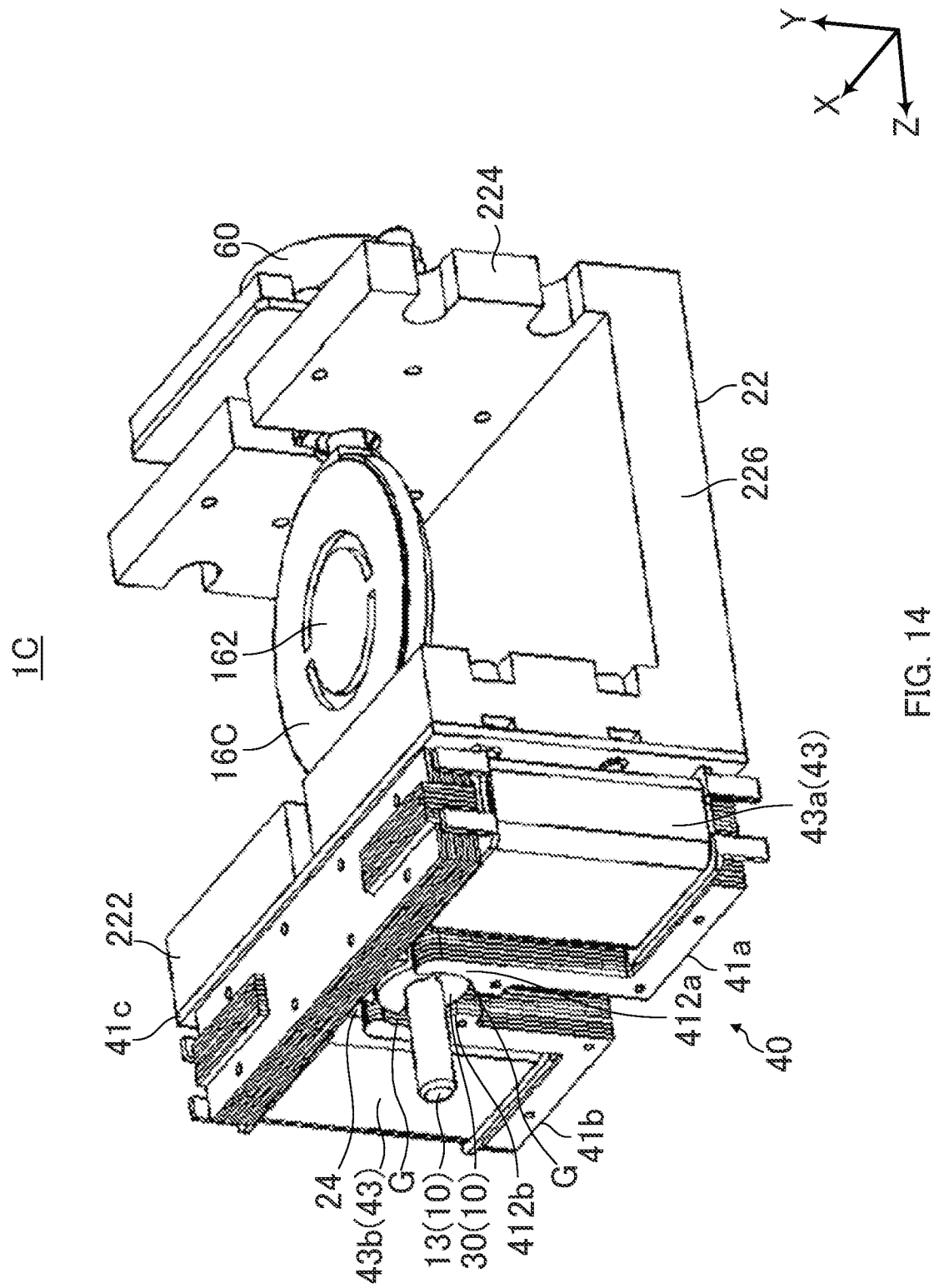
FIG. 14 is a perspective view of an external appearance of a rotary reciprocating drive actuator according to Embodiment 4 of the present invention.

FIG. 14 is a perspective view of an external appearance of a rotary reciprocating drive actuator according to Embodiment 4 of the present invention.

Rotary reciprocating drive actuator 1C illustrated in FIG. 14 has the same magnetic circuit configuration as those of rotary reciprocating drive actuator 1, and in the same configuration as that of rotary reciprocating drive actuator 1, mirror 16C that biaxially drives is adopted instead of mirror 16 that uniaxially drives. Therefore, in rotary reciprocating drive actuator 1C, the components similar to those of rotary reciprocating drive actuator 1 are denoted with the same reference numerals and description thereof will be omitted.

In rotary reciprocating drive actuator 1C, mirror 16C including reflection mirror part 162 that is driven into biaxial reciprocating rotation is provided such that it can be driven into reciprocating rotation in a direction orthogonal to the axis direction of shaft 13 with a driving source including movable magnet 30 and core unit 40 using electromagnetic interaction.

Mirror 16C includes an additional driving part that drives reflection mirror part 162 of mirror 16C in the direction orthogonal to the rotational direction of shaft 13 with respect to shaft 13.

Mirror 16C including the additional driving part is a micro electro mechanical system (MEMS) mirror, for example, and is configured to speedily rotate reflection mirror part 162 of mirror 16C about one axis orthogonal to shaft 13, for example. With this configuration, reflection mirror part 162 of mirror 16C is driven by core unit 40 and movable magnet 30 into reciprocating rotation about shaft 13, and is driven by the additional driving part into reciprocating rotation in a direction orthogonal to the axis direction.

Rotary reciprocating drive actuator 1C can ensure high torque generation efficiency, suppressed heat transfer to mirror 16C serving as the movable object, and accurate flatness of reflection mirror part 162 serving as a reflecting surface can be ensured. In addition, it is possible to achieve high manufacturability, high assembly accuracy, and driving at a high amplitude even when mirror 16C is a large mirror.

Schematic Configuration of Scanner System

Figure 15:
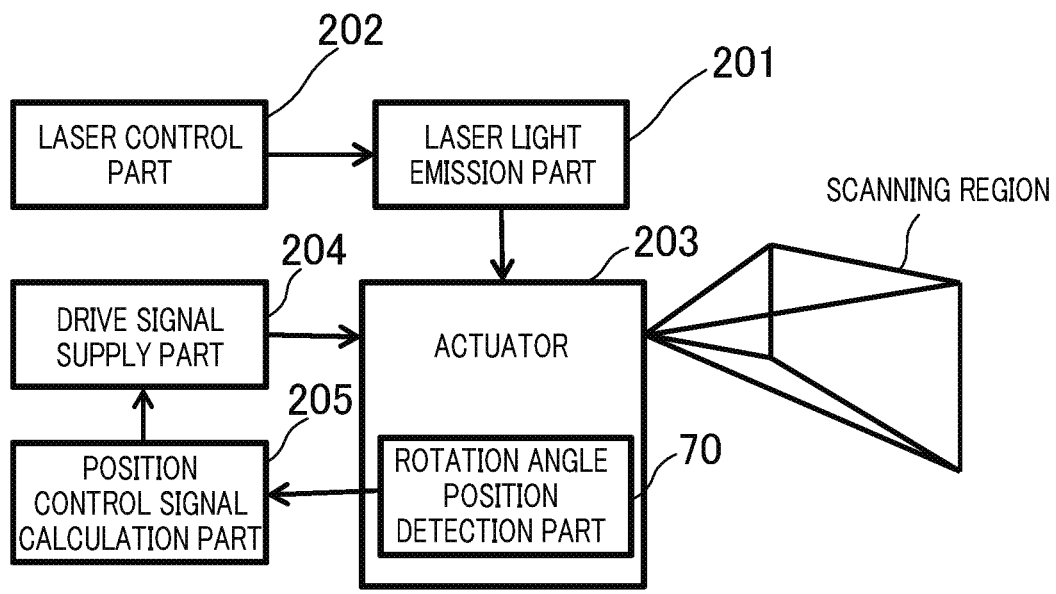
FIG. 15 is a block diagram illustrating a configuration of a main part of a first example of a scanner system including a rotary reciprocating drive actuator.
Figure 16:
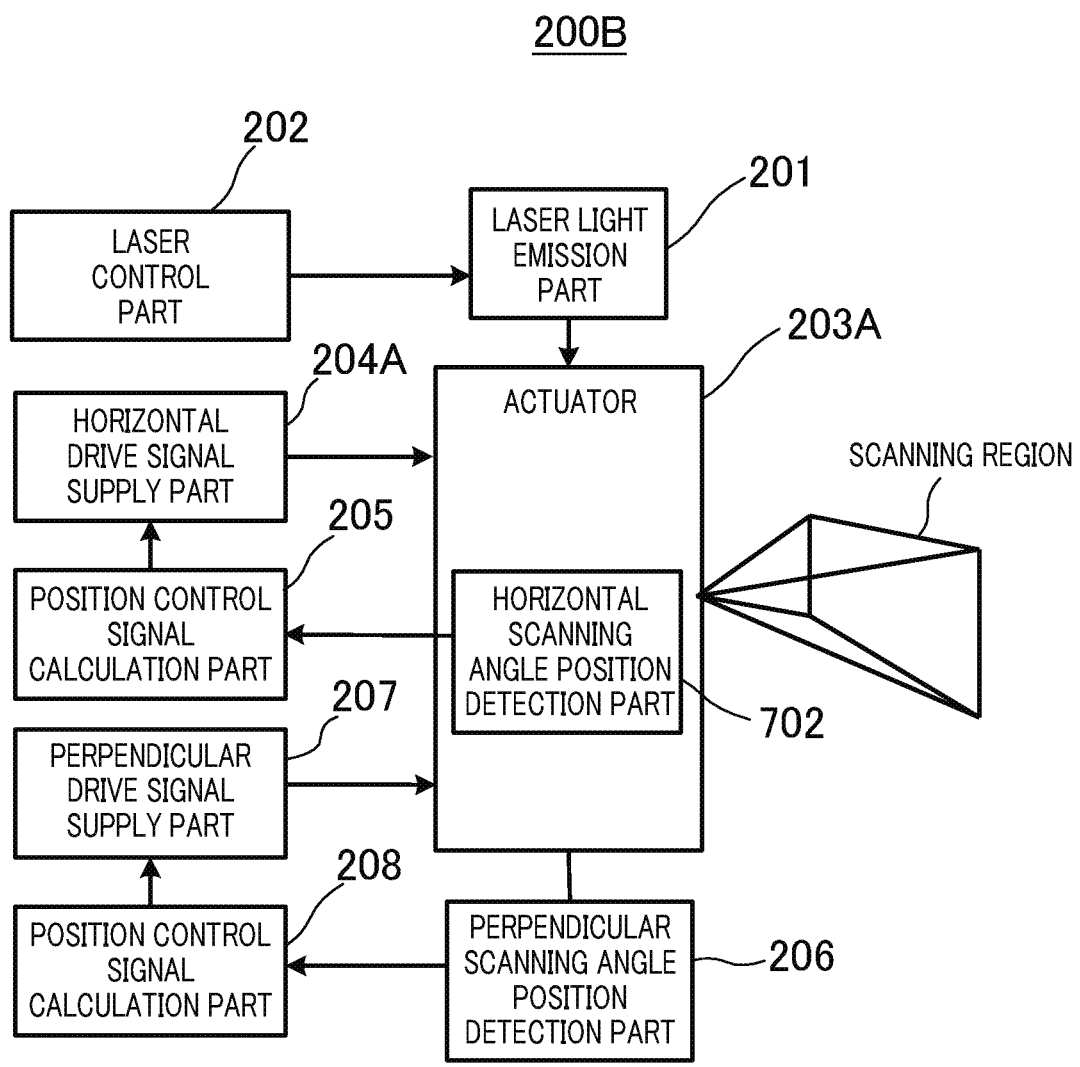
FIG. 16 is a block diagram illustrating a configuration of a main part of a second example of a scanner system including a rotary reciprocating drive actuator.

FIG. 15 is a block diagram illustrating a configuration of a main part of a first example of scanner system 200A including a rotary reciprocating drive actuator, and FIG. 16 is a block diagram illustrating a configuration of a main part of a second example of scanner system 200B including rotary reciprocating drive actuator.

Scanner system 200A illustrated in FIG. 15 includes laser light emission part 201, laser control part 202, actuator 203, drive signal supply part 204, and position control signal calculation part 205.

In scanner system 200A, an object is scanned using rotary reciprocating drive actuator 203 that can uniaxially dive a mirror into reciprocating rotation, and rotary reciprocating drive actuators 1 to 1B of the embodiments may be applied as rotary reciprocating drive actuator 203, for example.

Laser control part 202 drives laser light emission part 201 to control the laser emission. Laser light emission part 201 is, for example, a laser diode (LD) serving as a light source, a lens configured for convergence of output laser and the like. Laser light from the light source is emitted to mirror 16 of actuator 203 through a lens system.

With reference to the actual angle position of shaft 13 (mirror 16) acquired by rotation angle position detection part 70 and a target angle position, position control signal calculation part 205 generates and outputs a drive signal for controlling shaft 13 (mirror 16) at a target angle position. For example, on the basis of the angle position of acquired actual shaft 13 (mirror 16), and a signal indicating a target angle position obtained by conversion of a saw waveform (see FIG. 6A) data stored in a waveform memory not illustrated and the like, position control signal calculation part 205 generates a position control signal and outputs the position control signal to drive signal supply part 204.

Drive signal supply part 204 supplies a desired drive signal to coil 43 of actuator 203 to drive actuator 203 into reciprocating rotation, thereby scanning an object.

Scanner system 200B illustrated in FIG. 16 includes, in addition to laser light emission part 201 and laser control part 202 similar to those of scanner system 200A, actuator 203A, horizontal scanning angle position detection part 702 provided in actuator 203A, horizontal drive signal supply part 204A, position control signal calculation part 205, perpendicular scanning angle position detection part 206, perpendicular drive signal supply part 207, and position control signal calculation part 208.

Scanner system 200B scans an object using actuator 203A that can drive the mirror (i.e., reflection mirror part 162) into biaxial reciprocating rotation, and rotary reciprocating drive actuator 1C of the present embodiment may be applied as actuator 203A.

Rotary reciprocating drive actuator 1C serving as actuator 203A is driven into reciprocating rotation about shaft 13 to horizontally emit laser light reflected by reflection mirror part 162 of mirror 16C. In addition, in rotary reciprocating drive actuator 1C, reflection mirror part 162 is driven into reciprocating rotation on an axial direction orthogonal to shaft 13.

Horizontal scanning angle position detection part 702 has a function similar to that of rotation angle position detection part 70, and detects the rotation angle position about shaft 13, and in turn, shaft 13 of reflection mirror part 162, and, outputs it to position control signal calculation part 205.

With the actual angle position of shaft 13 (the angle position in the horizontal scanning of mirror 16) acquired by horizontal scanning angle position detection part 702, and a saw waveform (see FIG. 6A) data stored in a waveform memory not illustrated and the like, position control signal calculation part 205 generates a position control signal for controlling the position to a target angle position, and outputs it to horizontal drive signal supply part 204A. Horizontal drive signal supply part 204A has a function a similar to that of drive signal supply part 204, and outputs a drive signal to coil 43 of actuator 203A to drive reflection mirror part 162 of actuator 203 into reciprocating rotation in a horizontal scanning direction, thereby horizontally scanning an object.

Perpendicular scanning angle position detection part 206 detects the rotation angle position of rotational movement about the axis (here, X axis) orthogonal to shaft 13 at reflection mirror part 162, and outputs it to position control signal calculation part 208.

On the basis of actual shaft 13 acquired by perpendicular scanning angle position detection part 206, i.e., the angle position in the actual perpendicular scanning of mirror 16, and information representing a target angle position converted using perpendicular scanning saw waveform data stored in a waveform memory not illustrated and the like, position control signal calculation part 208 generates a position control signal for controlling the position to a target angle position, and outputs it to perpendicular drive signal supply part 207. Perpendicular drive signal supply part 207 outputs a drive signal to actuator 203A to drive reflection mirror part 162 of actuator 203A into reciprocating rotation in a perpendicular scanning direction, thereby perpendicularly scanning an object.

Note that the configurations that function as the attenuation part in the present embodiment may be appropriately modified or combined in rotary reciprocating drive actuators 1, 1A, 1B and 1C of the embodiments. For example, it is possible to adopt a combination of attenuator 60 serving as a rotary damper using magnetic fluid R, a rotary damper using oil in place of magnetic fluid in attenuator 60, and electricity filter 78 such as a low-pass filter, a band-pass filter, or a notch filter. With this configuration, attenuation of resonance can be increased, and thus rotary reciprocating drive actuators 1, 1A, 1B and 1C with suppressed ringing and high controllability is achieved. Thus, improvement of reliability of rotary reciprocating drive actuators 1, 1A, 1B and 1C can be achieved.

While coil 43 on fixing bodies 20 and 20B side is provided at core unit 40 in the present embodiment, this is not limitative, and rotary reciprocating drive actuators 1, 1A, 1B and 1C of the embodiments may be configured without providing the core. For example, vibration actuator 1 may not include core 41, and may be a rotary reciprocating drive actuator including a movable member including shaft 13 and movable magnet 30 fixed to shaft 13, and fixing body including coil 43 and configured to rotatably support shaft 13, in which movable member 10 is driven into reciprocating rotation with electromagnetic interaction between coil 43 and movable magnet 30 about shaft 13 with respect to the fixing body. In this case, as with movable magnet 30, the movable magnet has a ring shape, with even-numbered magnetic poles 31 and 32 alternately magnetized in S poles and N poles at the outer periphery of shaft 13. In addition, as with coil 43, the coil is disposed at a position where a torque for rotating the movable magnet is generated by electromagnetic interaction with respect to the movable magnet in the fixing body. For example, the coil disposed at a position where a torque for driving the movable magnet into reciprocating rotation is generated electromagnetic interaction with the movable magnet with even-numbered magnetic poles.

Thus, in a vibration actuator provided with no core 41, whose other configurations are identical to those of vibration actuator 1, the movable magnet can achieve operational effect similar to that of movable magnet 30. In addition, in this vibration actuator, the number of magnetic poles magnetized by coil 43 and the number of magnetic poles of the movable magnet are equal to each other. In addition, the even-numbered magnetic poles configured to be magnetized by the coil are disposed opposite each other with air gap G between movable magnet 30 and them in the radial direction of the shaft. Additionally, the fixing body includes rotation angle position holding part 24 that is disposed opposite to movable magnet 30 with air gap G therebetween, and holds the rotation angle position of movable magnet 30 with the magnetic attractive force generated with movable magnet 30. With this configuration, high manufacturability, high assembly accuracy, and driving of the movable object with high amplitude.

The above description of embodiments of the present invention has been given. The above description is an example of a suitable embodiment of the present invention and the scope of the invention is not limited thereto. In other words, the above description of the configuration of the device and the shape of each part is an example, and it is clear that various changes and additions to these examples are possible within the scope of the present invention.

This application is entitled to and claims the benefit of Japanese Patent Application No. 2018-121167 filed on Jun. 26, 2018, the disclosure each of which including the specification, drawings and abstract is incorporated herein by reference in its entirety.

INDUSTRIAL APPLICABILITY

The rotary reciprocating drive actuator according to embodiments of the present invention can achieve high manufacturability, high assembly accuracy and driving at a high amplitude even when the movable object is a large mirror, and is particularly useful for scanners configured to rotate mirrors, which require durability.

REFERENCE SIGNS LIST 1, 1A, 1B, 1C Rotary reciprocating drive actuator
10, 10A, 10B Movable member
13, 13A, 13B Shaft
13a One end portion
13b The other end portion
15, 15A, 15B Mirror holder
16, 16B, 16C Mirror
162 Reflection mirror part
16a Reflecting surface
20, 20B Fixing body
22, 22A, 22B Base
222, 222A One end surface part
222a, 224a Cutout hole
224, 224A The other end surface part
226, 226A Main body surface part
23a, 23b, 232, 234 Bearing
24 Magnet position holding part
27, 27A Core fixation plate
28, 28A, 29, 29A Securing member
30 Movable magnet
31, 32 Magnetic pole
34 Magnetic pole switching part
40 Core unit
41 Core
41a First core
41b Second core
41c Bridge core
411a, 411b Core part
412a, 412b Magnetic pole
43, 43a, 43b Coil
44 Bobbin
60 Attenuator
62 Case
63 Magnet
64 Rotational body
641 Disk part
642 Recess
644 Outer cylindrical part
65 Upper closure part
652 Inner cylindrical part
66 Lower closure part
70, 70A Rotation angle position detection part
702 Horizontal scanning angle position detection part
72 Encoder disk
72A Magnetic sensor magnet
73A Holder
74 Optical sensor
74A Magnetic sensor
75A Fixing member
76, 76A Sensor substrate
77 Drive signal supply part
78 Electricity filter
200A, 200B Scanner system
201 Laser light emission part
202 Laser control part
203, 203A Actuator
204 Drive signal supply part
204A Horizontal drive signal supply part
205, 208 Position control signal calculation part
206 Perpendicular scanning angle position detection part
207 Perpendicular drive signal supply part

What is claimed is:

1. A rotary reciprocating drive actuator comprising:
a movable member including a shaft to which a movable object is connected and a movable magnet fixed to the shaft;
a fixing body including coils and a core, the core including even-numbered core parts and even-numbered magnetic poles, the even-numbered core parts around which the coils are respectively wound, arranged parallel to each other so as to sandwich the movable magnet in a direction perpendicular to a rotation axis of the shaft, the fixing body being configured to rotatably support the shaft, the rotary reciprocating drive actuator being configured to use electromagnetic interaction between the coils that is energized and the movable magnet to drive the movable member into reciprocating rotation about the shaft with respect to the fixing body,
wherein the movable magnet has a ring shape with even-numbered magnetic poles alternately magnetized in an S pole and an N pole at an outer periphery of the shaft,
wherein the number of the even-numbered magnetic poles of the core and the number of the even-numbered magnetic poles of the movable magnet are equal to each other,
wherein the even-numbered magnetic poles of the core are disposed opposite to the movable magnet at an outer periphery side of the shaft with an air gap between the even-numbered magnetic poles of the core and the movable magnet,
wherein the fixing body includes a rotation angle position holding part disposed opposite to the movable magnet with an air gap between the rotation angle position holding part and the movable magnet, the rotation angle position holding part being configured to use a magnetic attractive force generated between the rotation angle position holding part and the movable magnet to hold a rotation angle position of the movable magnet, and
wherein the coils that are parallel and the rotation angle position holding part are arranged to surround the movable member in a plane orthogonal to the rotation axis.

2. The rotary reciprocating drive actuator according to claim 1, wherein a magnetic pole switching part of the movable magnet is disposed at a position that is symmetric about each of the even-numbered magnetic poles of the core when the movable magnet is held by the rotation angle position holding part at the rotation angle position.

3. The rotary reciprocating drive actuator according to claim 1, wherein in the movable magnet, the even-numbered magnetic poles are magnetized at an even interval at the outer periphery of the shaft.

4. The rotary reciprocating drive actuator according to claim 1,
wherein the shaft is pivotally supported through a bearing provided at the fixing body, and
wherein the bearing is disposed at positions sandwiching the movable object at the shaft.

5. The rotary reciprocating drive actuator according to claim 1,
wherein the shaft is pivotally supported through a bearing provided at the fixing body, and
wherein the bearing is disposed between the movable magnet and the movable object at the shaft.

6. The rotary reciprocating drive actuator according to claim 1, wherein the movable object is a mirror configured to reflect scanning light.

7. The rotary reciprocating drive actuator according to claim 1, wherein the movable object includes an additional driving part configured to drive the movable object with respect to the shaft in a direction orthogonal to a rotational direction of the shaft.

8. The rotary reciprocating drive actuator according to claim 1, wherein the rotation angle position holding part is a magnet.

9. The rotary reciprocating drive actuator according to claim 8, wherein the magnet serving as the rotation angle position holding part is disposed opposite to the movable magnet in a radial direction of the movable magnet between the even-numbered magnetic poles of the core.

10. The rotary reciprocating drive actuator according to claim 1, wherein the rotation angle position holding part is a magnetic pole having a protruding shape provided at the core.

11. The rotary reciprocating drive actuator according to claim 10, wherein in the core, a portion where the rotation angle position holding part is provided and a portion including the even-numbered magnetic poles are formed as separate members.

12. The rotary reciprocating drive actuator according to claim 1, wherein a rotation angle position detection part configured to detect a rotation angle position of the shaft.

13. The rotary reciprocating drive actuator according to claim 12, wherein the rotation angle position detection part includes a photosensor.

14. The rotary reciprocating drive actuator according to claim 1, further comprising an attenuation part configured to attenuate a resonance when the movable member is movable.

15. The rotary reciprocating drive actuator according to claim 14, wherein the attenuation part is a rotary damper using oil.

16. The rotary reciprocating drive actuator according to claim 14, wherein the attenuation part is a rotary damper using magnetic fluid.

17. The rotary reciprocating drive actuator according to claim 14, wherein the attenuation part is magnetic fluid disposed between the movable magnet and the even-numbered magnetic poles of the core and between the movable magnet and the rotation angle position holding part.

18. The rotary reciprocating drive actuator according to claim 14, wherein the attenuation part is an electric filter configured to filter a drive signal input to the coils.

19. The rotary reciprocating drive actuator according to claim 14, wherein the attenuation part includes a rotary damper configured to connect the fixing body and the shaft, and an electric filter configured to filter a drive signal input to the coils.

20. A rotary reciprocating drive actuator comprising:
a movable member including a shaft and a movable magnet fixed to the shaft,
a fixing body including coils and a core, the core including even-numbered core parts and even-numbered magnetic poles, the even-numbered core parts around which the coils are respectively wound, arranged parallel to each other so as to sandwich the movable magnet in a direction perpendicular to a rotation axis of the shaft, the fixing body being configured to rotatably support the shaft, the rotary reciprocating drive actuator being configured to use electromagnetic interaction between the coils and the movable magnet to drive the movable member into reciprocating rotation about the shaft with respect to the fixing body, wherein the movable magnet has a ring shape with even-numbered magnetic poles alternately magnetized in an S pole and an N pole at an outer periphery of the shaft, wherein the coils are disposed at a position where a torque that rotates the movable magnet by the electromagnetic interaction with respect to the movable magnet, wherein the fixing body includes a rotation angle position holding part disposed opposite to the movable magnet with an air gap between the rotation angle position holding part and the movable magnet, the rotation angle position holding part being configured to use a magnetic attractive force generated between the rotation angle position holding part and the movable magnet to hold a rotation angle position of the movable magnet, and wherein the coils that are parallel and the rotation angle position holding part are arranged to surround the movable member in a plane orthogonal to the rotation axis.

21. The rotary reciprocating drive actuator according to claim 20, wherein in the movable magnet, the even-numbered magnetic poles are magnetized at an even interval at the outer periphery of the shaft, and wherein the coils are disposed at a position where a torque that causes reciprocating rotation of the movable magnet is generated with the electromagnetic interaction with the even-numbered magnetic poles.

* * * * *